(12) United States Patent
Kobayashi et al.

(10) Patent No.: US 12,305,295 B2
(45) Date of Patent: May 20, 2025

(54) POWDER FEEDING DEVICE, THERMAL SPRAYING APPARATUS, POWDER FEEDING METHOD, AND THERMAL SPRAYING METHOD

(71) Applicants: Tokyo Electron Limited, Tokyo (JP); CKD Corporation, Aichi (JP)

(72) Inventors: Yoshiyuki Kobayashi, Tokyo (JP); Hiroshi Itafuji, Aichi (JP)

(73) Assignees: Tokyo Electron Limited, Tokyo (JP); CKD Corporation, Aichi (JP)

( * ) Notice: Subject to any disclaimer, the term of this patent is extended or adjusted under 35 U.S.C. 154(b) by 749 days.

(21) Appl. No.: 17/286,598

(22) PCT Filed: Oct. 28, 2019

(86) PCT No.: PCT/JP2019/042163
§ 371 (c)(1),
(2) Date: Apr. 19, 2021

(87) PCT Pub. No.: WO2020/090732
PCT Pub. Date: May 7, 2020

(65) Prior Publication Data
US 2021/0371964 A1 Dec. 2, 2021

(30) Foreign Application Priority Data
Oct. 29, 2018 (JP) .................. 2018-203266

(51) Int. Cl.
*C23C 4/134* (2016.01)
*B05B 7/14* (2006.01)
(Continued)

(52) U.S. Cl.
CPC .............. *C23C 4/134* (2016.01); *B05B 7/144* (2013.01); *B05B 7/22* (2013.01); *B65G 53/66* (2013.01)

(58) Field of Classification Search
USPC ......................................... 118/302, 308, 309
See application file for complete search history.

(56) References Cited

U.S. PATENT DOCUMENTS

| | | | | |
|---|---|---|---|---|
| 5,487,624 A | * | 1/1996 | Toyota | B05B 12/085 406/14 |
| 6,176,647 B1 | * | 1/2001 | Itoh | B05B 7/144 406/176 |
| 2018/0299805 A1 | * | 10/2018 | Fujita | G03G 15/0875 |

FOREIGN PATENT DOCUMENTS

| | | | | |
|---|---|---|---|---|
| CN | 104760819 | | 7/2015 | |
| CN | 106702379 A | * | 5/2017 | ............. C23C 24/10 |

(Continued)

OTHER PUBLICATIONS

English translation WO-2018/105700 (Year: 2018).*
English Translation CN106702379-A (Year: 2017).*

*Primary Examiner* — Yewebdar T Tadesse
(74) *Attorney, Agent, or Firm* — IPUSA, PLLC

(57) ABSTRACT

A powder feeder according to one aspect of the present disclosure is a powder feeding device that feeds powder from a feeder to a nozzle. The powder feeding device includes a cartridge configured to store the powder in an airtight condition, and includes the feeder. The cartridge includes a port from which the powder is stored and withdrawn, and an open/close valve for opening and closing the port. The feeder includes a connection portion to which the cartridge is removably connected, a supply port configured to supply the powder in the cartridge connected to the connection portion into the feeder, and an opening/closing valve for opening and closing the supply port. The feeder is configured to insert the powder supplied from the supply port to the feeder into the nozzle, and the cartridge and the feeder are configured to form an enclosed space between the (Continued)

port and the supply port in response to the cartridge being connected to the connection portion.

19 Claims, 21 Drawing Sheets

(51) Int. Cl.
  *B05B 7/22* (2006.01)
  *B65G 53/66* (2006.01)

(56) References Cited

FOREIGN PATENT DOCUMENTS

| CN | 108137249 | 6/2018 | | |
|---|---|---|---|---|
| JP | 2014-172696 | 9/2014 | | |
| WO | WO-2018105700 A1 | * | 6/2018 | ............ B22F 1/0062 |

* cited by examiner

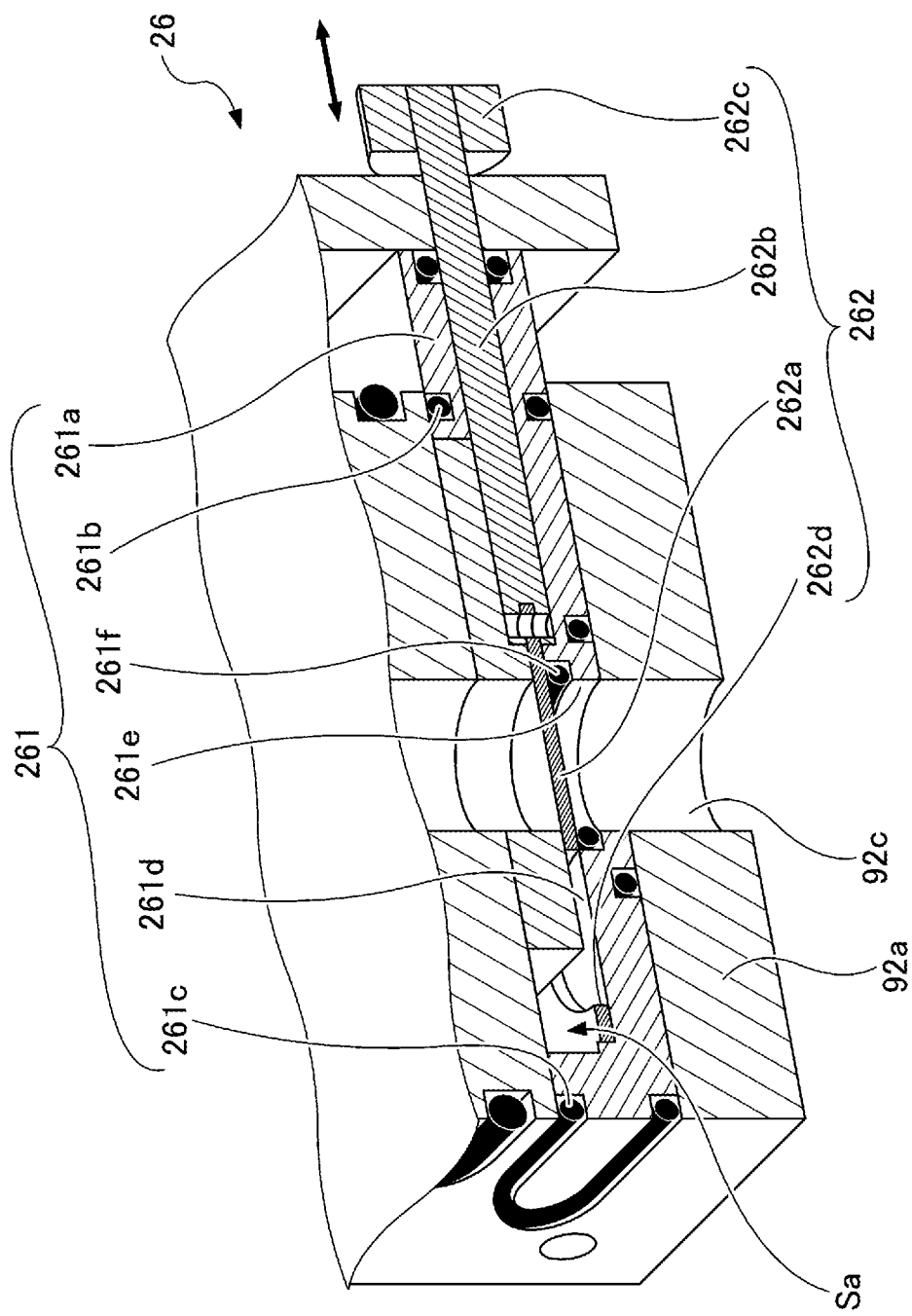

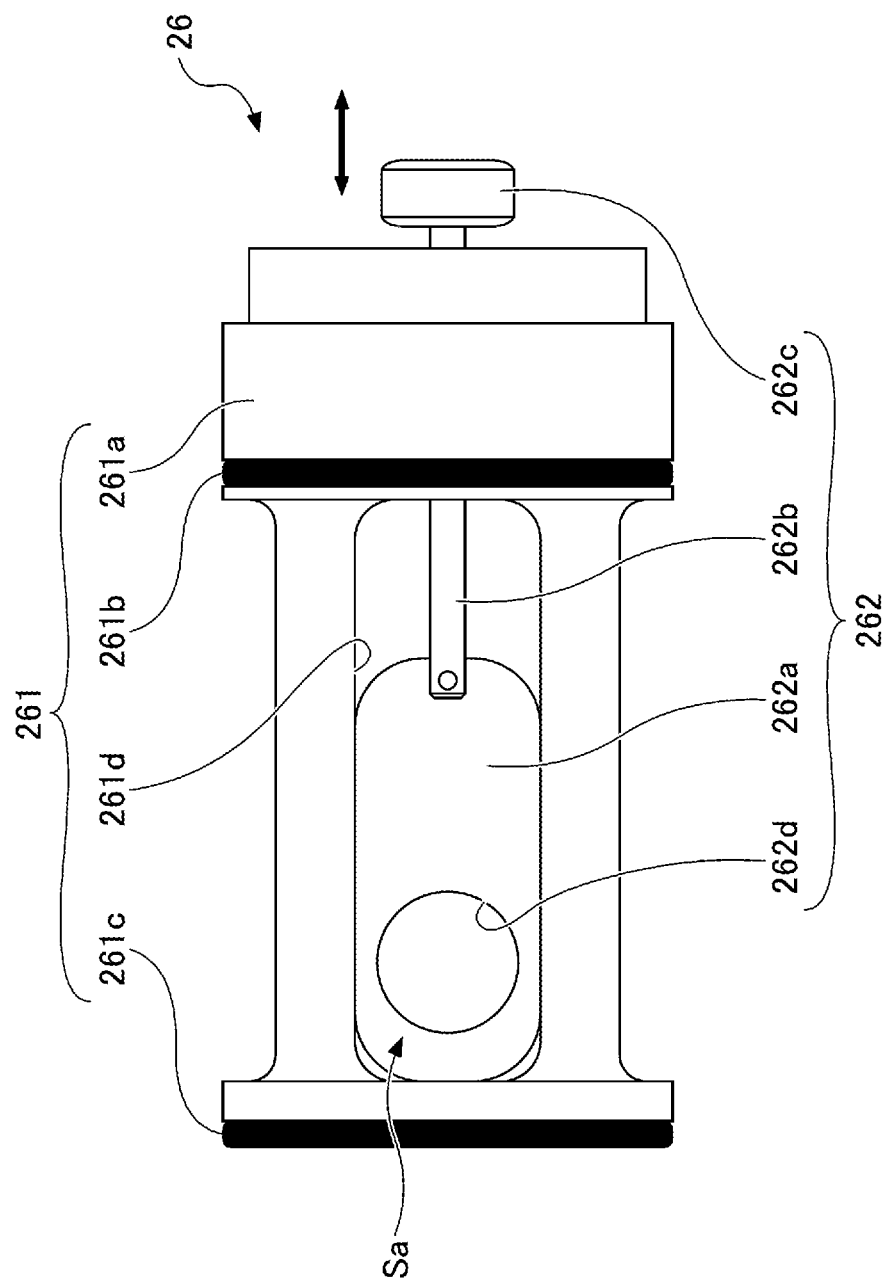

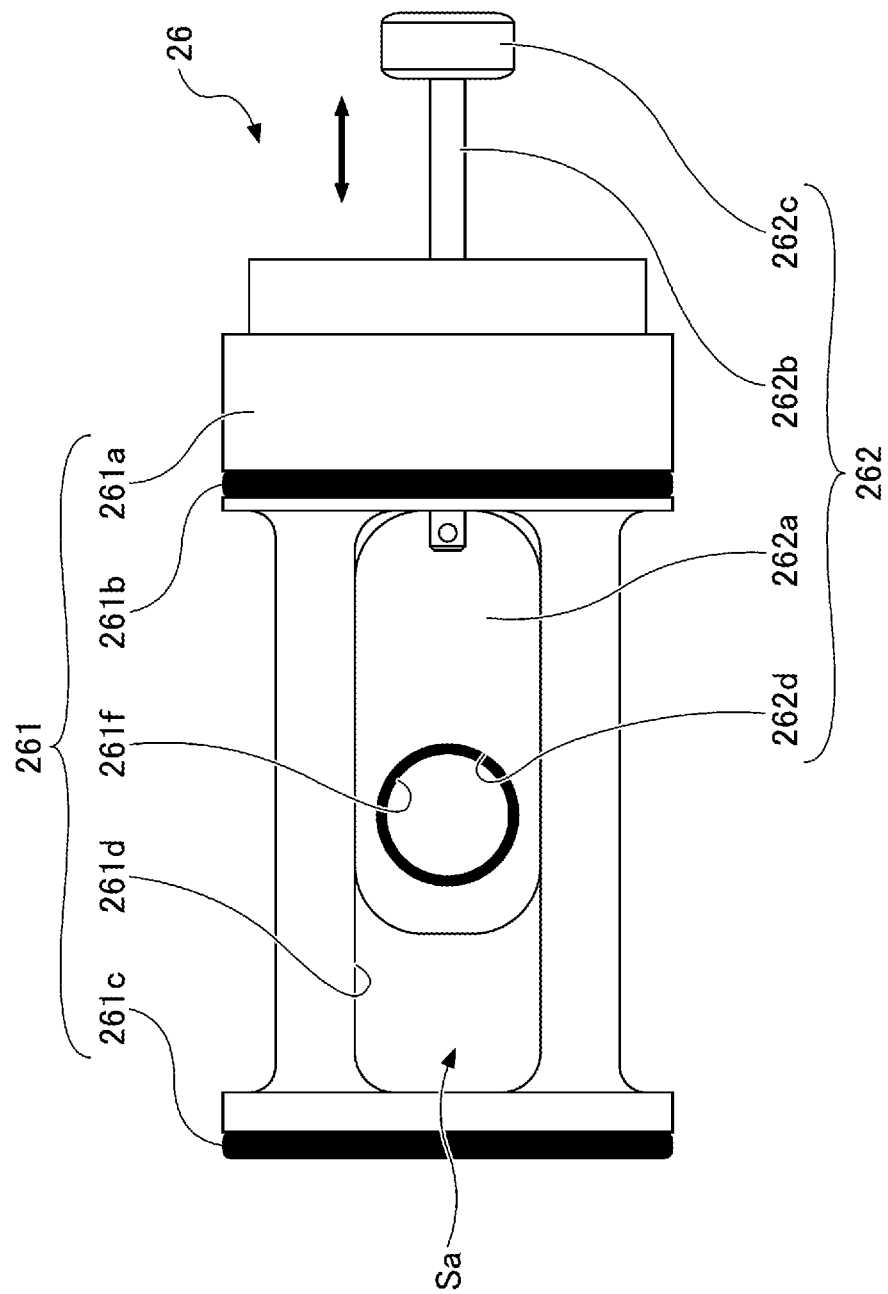

POWDER FEEDING DEVICE, THERMAL SPRAYING APPARATUS, POWDER FEEDING METHOD, AND THERMAL SPRAYING METHOD

TECHNICAL FIELD

The present disclosure relates to a powder feeding device, a thermal spraying apparatus, a powder feeding method, and a thermal spraying method.

BACKGROUND

A thermal spraying apparatus is known, in which thermal spraying material powder supplied from a container filled with an inert gas is melted by heating, and in which molten powder is sprayed onto a workpiece to form a thermal sprayed film on the workpiece (see, for example, Patent Document 1).

RELATED ART DOCUMENT

Patent Document

[Patent Document 1] Japanese Laid-open Patent Application Publication No. 2014-172696

SUMMARY

Problem to be Solved by the Invention

The present disclosure provides a technique for replenishing a feeder container with powder, without causing reaction with moisture, nitrogen, and oxygen.

Means for Solving Problem

A powder feeder according to one aspect of the present disclosure is a powder feeding device that feeds powder from a feeder to a nozzle. The powder feeding device includes a cartridge configured to store the powder in an airtight condition, and includes the feeder. The cartridge includes a port from which the powder is stored and withdrawn, and an open/close valve for opening and closing the port. The feeder includes a connection portion to which the cartridge is removably connected, a supply port configured to supply the powder in the cartridge connected to the connection portion into the feeder, and an opening/closing valve for opening and closing the supply port. The feeder is configured to insert the powder supplied from the supply port to the feeder into the nozzle, and the cartridge and the feeder are configured to form an enclosed space between the port and the supply port in response to the cartridge being connected to the connection portion.

Effect of Invention

According to the present disclosure, powder can be refilled into the feeder container without reacting with moisture, nitrogen, and oxygen.

BRIEF DESCRIPTION OF THE DRAWINGS

FIG. 17A is a diagram (1) illustrating an example of the configuration of the shutter provided in the feeder;

FIG. 17B is the diagram (1) illustrating the example of the configuration of the shutter provided in the feeder;

FIG. 18B is the diagram (2) illustrating the example of the configuration of the shutter provided in the feeder.

DESCRIPTION OF EMBODIMENTS

Figure 1:
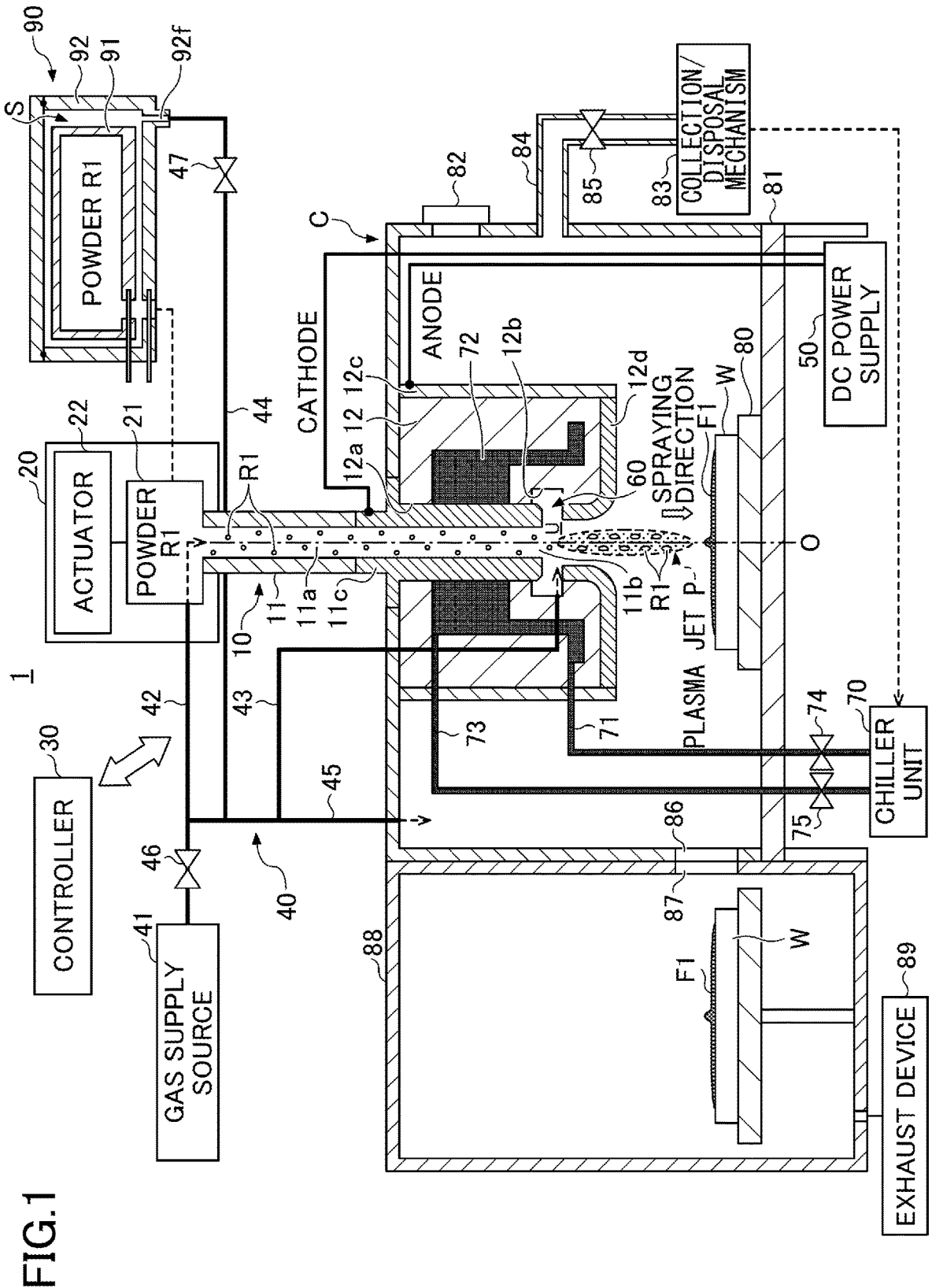
FIG. 1 is a cross-sectional view illustrating an example of the configuration of a plasma spraying apparatus according to a first embodiment.

Hereinafter, non-limiting example embodiments of the present disclosure will be described with reference to the accompanying drawings. In all the accompanying drawings, the same or corresponding reference numerals shall be affixed to the same or corresponding parts or components, and duplicating description shall be omitted.

First Embodiment (Plasma Spraying Apparatus)

A plasma spraying apparatus according to a first embodiment will be described with reference to FIG. 1. FIG. 1 is a cross-sectional view illustrating an example of the configuration of the plasma spraying apparatus according to the first embodiment.

As illustrated in FIG. 1, the plasma spraying apparatus 1 is a device that performs plasma spraying in an atmosphere-regulated (environmentally controlled) chamber C filled with an inert gas. In the plasma spraying apparatus 1, powder of a thermal spraying material (hereinafter referred to as "powder R1") is injected from an opening 11b at the tip of a nozzle 11, and is sprayed toward the surface of a substrate W in the atmosphere-regulated chamber C while the powder is melted by heat of a plasma jet P formed from a high-speed gas. As a result, a film (hereinafter referred to as a "thermal sprayed film") F1 of a thermal spraying material is formed on the surface of the substrate W.

An example of the substrate W is an electrode of copper (Cu) and the like, and an example of the powder R1 is powder of lithium (Li). For example, by completely melting and depositing lithium powder onto an electrode of copper using the plasma spraying apparatus 1, it is possible to dope the electrode used in a lithium secondary battery with lithium ions. However, the powder R1 is not limited to lithium powder, and may be, for example, powder of aluminum (Al), copper (Cu), silver (Ag), gold (Au), or a mixture thereof.

Because the plasma spraying apparatus 1 melts a thermal spraying material with low energy, powder of the thermal spraying material does not sublimate, and can be deposited in a liquid state. For this reason, one of advantages of the plasma spraying apparatus 1 is that even a specific thermal spraying material such as lithium having a low melting point can be deposited by thermal spraying. Accordingly, the plasma spraying apparatus 1 is particularly suitable when powder of a metal having a low melting point, such as lithium, is used as a thermal spraying material.

The plasma spraying apparatus 1 includes a feeding section 10, a controller 30, a gas supply section 40, a plasma generating section 60, a chamber C, a powder feeding mechanism 90, a collection/disposal mechanism 83, and a dry chamber 88.

The feeding section 10 includes a nozzle 11 and a feeder 20. The feeding section 10 conveys powder R1 with a plasma generating gas, and injects the powder R1 from an opening at the tip. The feeder 20 supplies the powder R1 to the nozzle 11. The powder R1 is stored in a container 21 in the feeder 20. The powder R1 is fine powder with a median particle diameter between 1 μm and 20 μm.

The feeder 20 is provided with an actuator 22. The nozzle 11 is a straight tubular member in which a flow passage 11a for conveying the powder R1 is formed. The flow passage 11a in the nozzle 11 communicates with the container 21. The powder R1 is entered from the container 21 into the flow passage 11a in the nozzle 11 by the power of the actuator 22. The feeder 20 may be, for example, a bowl feeder.

In addition to the powder R1, a plasma generating gas is supplied to the nozzle 11. The plasma generating gas is a gas for generating a plasma. The plasma generating gas also functions as a carrier gas conveying the powder R1 in the flow passage 11a. In the gas supply section 40, plasma generating gas is supplied from a gas supply source 41, opening/closing and a flow rate are controlled through a valve 46 and a mass flow controller (MFC), and the plasma generating gas is supplied to the flow passage 11a in the nozzle 11 through a pipe 42. Gases such as argon gas (Ar), helium gas (He), nitrogen gas ($N_2$), hydrogen gas ($H_2$), and a combination of these gases can be used as the plasma generating gas. In the first embodiment, an example of supplying argon gas as a plasma generating gas will be described.

The nozzle 11 passes through a main unit 12 of the plasma generating section 60, and a tip of the nozzle 11 protrudes into a plasma generating space U. The powder R1 is conveyed to the tip of the nozzle 11 by the plasma generating gas, and injected, together with the plasma generating gas, into the plasma generating space U through the opening 11b at the tip.

The main unit 12 is formed of an insulating material. The main unit 12 has a through-hole 12a in the center of the main unit 12. A first half 11c of the nozzle 11 is inserted into the through-hole 12a of the main unit 12. The first half 11c of the nozzle 11 is connected to a direct-current (DC) power supply 50, and also functions as an electrode (cathode) to which current is supplied from the DC power supply 50. The nozzle 11 is formed of metal.

The plasma generating space U is defined mainly by a recess 12b and a projecting part 12d of the main unit 12, and the tip of the nozzle 11 protrudes into the plasma generating space U. The projecting part 12d is connected to a metal plate 12c provided on the outer wall of the main unit 12 at one end. The metal plate 12c is connected to the DC power supply 50. Accordingly, the metal plate 12c and the projecting part 12d function as an electrode (anode).

Between the electrodes, electrical power between 500 W and 10 kW is supplied from the DC power supply 50, and discharge occurs between the tip of the nozzle 11 and the other end of the projecting part 12d. Accordingly, the plasma generating section 60 ionizes (decomposes) argon gas injected from the nozzle 11 in the plasma generating space U to generate an argon plasma.

In addition, argon gas is supplied to the plasma generating space U as a swirling flow. Argon gas is supplied from the gas supply source 41, and opening/closing and flow rate are controlled through a valve 46 and a mass flow controller (MFC). Subsequently, the argon gas flows through a pipe 43 into the main unit 12, and is supplied into the plasma generating space U in a lateral direction.

Although only one supply path for the argon gas introduced into the plasma generating space U is illustrated in FIG. 1, multiple supply paths are provided in the main unit 12. Accordingly, the argon gas is supplied from the multiple supply paths to the plasma generating space U in a form of a lateral swirling flow. This prevents diffusion of the generated plasma, and the plasma jet P is linearly emitted. As a result, the plasma generating section 60 decomposes the plasma generating gas injected from the tip of the nozzle 11, and generates the plasma jet P having a common axis O with the nozzle 11. The term "having a common axis" means that a central axis of the feeding section 10 (nozzle 11) coincides with or almost coincides with a central axis of a spraying direction of the plasma jet generated by the plasma generating section 60.

According to the above-described configuration, the feeding section 10 causes the powder R1 and the argon gas to linearly flow through the flow passage 11a formed in the interior of the nozzle 11, and injects the powder R1 and the argon gas into the plasma generating space U, from the opening 11b at the tip. The injected powder R1 is melted by heat of the plasma jet P formed from the high-speed argon gas, and is sprayed toward the surface of the substrate W, thereby forming the thermal sprayed film F1 on the surface of the substrate W.

A refrigerant passage 72 is formed within the main unit 12. The refrigerant supplied from a chiller unit 70 circulates through a refrigerant pipe 71, a refrigerant passage 72, and a refrigerant pipe 73 in accordance with opening and closing of valves 74 and 75, and returns to the chiller unit 70. This allows the main unit 12 to cool, and the main unit 12 is prevented from becoming high temperature due to plasma heat. A window 82 is provided at the side wall of the chamber C for viewing the interior of the chamber C.

(Chamber)

The chamber C will be described with reference to FIG. 1. As illustrated in FIG. 1, the chamber C is a cylindrical hollow container. The chamber C is formed of, for example, aluminum, stainless steel, quartz, or the like. The chamber C supports the main unit 12 at the ceiling, and the feeding section 10 and the plasma generating section 60 are enclosed. The substrate W is placed on a stage 80 located at the bottom 81 of the chamber C. The interior of the chamber C is decompressed to a predetermined pressure, for example. However, the interior of the chamber C may not necessarily be decompressed.

Some powder R1, such as Li powder, may explode when exposed to moisture. Also, if some powder R1, such as Li powder, reacts with nitrogen or oxygen, the powder R1 becomes nitride or oxide and becomes stable from an active state. In such a case, the function of the lithium-ion battery for charging and discharging by moving lithium ions between a positive electrode and a negative electrode, is impaired.

Therefore, it is preferable that the powder R1 is placed in a space in which moisture, oxygen, and nitrogen components are minimized. Accordingly, the plasma spraying apparatus 1 minimizes moisture, oxygen, and nitrogen in the container 21 storing the powder R1, the nozzle 11, and the chamber C including the plasma generating space U, by enclosing the feeding section 10 and the plasma generating section 60 by the chamber C.

The interior of the chamber C is filled with argon gas. Argon gas is supplied from the gas supply source 41 into the chamber C through a pipe 45. However, the type of gas for filling the chamber C is not limited to argon gas, and any inert gas may be used to fill the chamber C. Thus, for example, the oxygen concentration inside the chamber C can be reduced to approximately 1 ppm ($10^{-4}$%) or less, and the oxygen concentration in a Li film deposited on a Cu electrode (substrate) can be reduced to approximately 0.5%. Thus, in the plasma spraying apparatus 1 according to the first embodiment, by performing deposition without reacting the powder R1 with moisture, oxygen, and nitrogen, characteristics of a film can be improved, and efficiency of a battery can be improved.

(Powder Feeding Mechanism)

Figure 2:
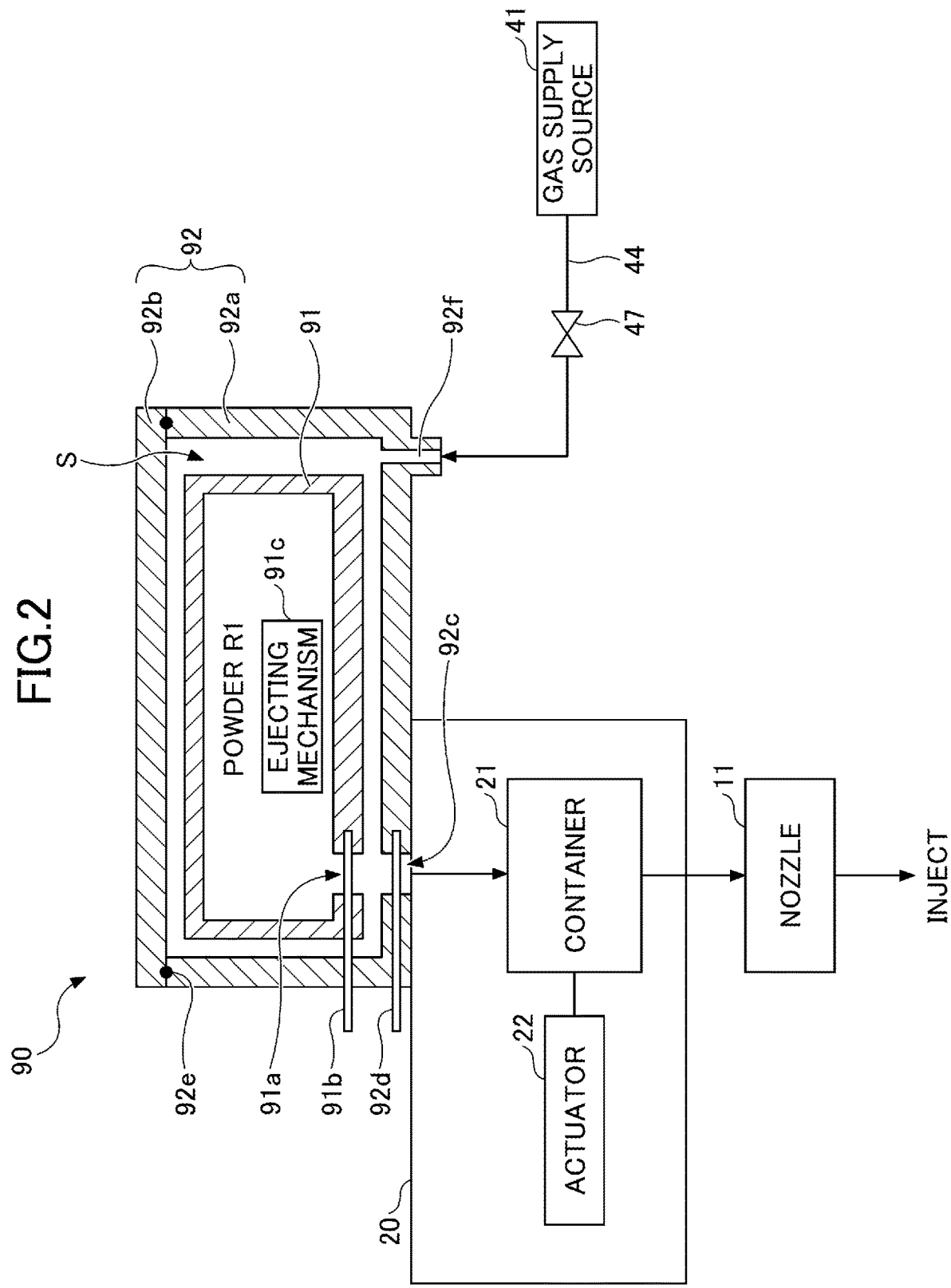
FIG. 2 is a diagram illustrating a powder feeding mechanism of the plasma spraying apparatus of FIG. 1.

The powder feeding mechanism 90 will be described with reference to FIG. 2. FIG. 2 is a diagram illustrating the powder feeding mechanism 90 of the plasma spraying apparatus 1 of FIG. 1.

As illustrated in FIG. 2, the powder feeding mechanism 90 supplies powder R1 to the container 21 of the feeder 20. The powder feeding mechanism 90 includes a cartridge 91 and a replenishing unit 92.

The cartridge 91 is a portable container that stores powder R1 in an airtight condition. In a case in which the powder R1 is to be stored into the cartridge 91, the cartridge 91 is filled with the powder R1 from a storage container stored in an airtight condition, for example, in a dry box located in an environmentally controlled dry booth. The dry booth is maintained at a humidity of, for example, 2% to 4%. The dry box is maintained at a humidity of, for example, 0.5% to 1.5%. This prevents the powder R1 from reacting with moisture, oxygen, and nitrogen prior to being filled into the cartridge 91. Also, in the dry box, powder R1 may be heated by a heating means such as a heater and then filled into the cartridge 91.

The cartridge 91 includes a port 91a, a shutter 91b, and an ejecting mechanism 91c.

The port 91a is an aperture from which the powder R1 is stored and withdrawn. The port 91a is formed at a location corresponding to a location of a supply port 92c, which will be described below, with the cartridge 91 contained in the replenishing unit 92.

The shutter 91b is, for example, a plate-like member capable of opening and closing the port 91a. When the shutter 91b is opened, the inside of the cartridge 91 communicates with the outside of the cartridge 91 through the port 91a, and the powder R1 in the cartridge 91 can be discharged to the outside through the port 91a. Meanwhile, when the shutter 91b is closed, communication between the inside and outside of the cartridge 91 is interrupted, and the powder R1 in the cartridge 91 is not discharged to the outside. This prevents the powder R1 filled in the cartridge 91 from reacting with moisture, oxygen and nitrogen even if the cartridge 91 is removed from the dry box into an atmosphere as long as the shutter 91b is in a closed state.

The ejecting mechanism 91c is a mechanism for ejecting the powder R1 stored in the cartridge 91. The ejecting mechanism 91c may be configured to continuously eject the powder R1, or may be configured to intermittently eject the powder R1. The powder R1 stored inside the cartridge 91 is ejected by the ejecting mechanism 91c while the shutter 91b is opened, so that the powder R1 inside the cartridge 91 is discharged to the outside through the port 91a. Examples of the ejecting mechanism 91c include a screw feeder. In a case in which a screw feeder is used as the ejecting mechanism 91c, the discharge amount of powder R1 per unit time can be adjusted by, for example, controlling rotational speed of the screw.

The replenishing unit 92 detachably accommodates the cartridge 91, and supplies the powder R1 in the cartridge 91 to the container 21 of the feeder 20 while maintaining airtightness. The replenishing unit 92 includes a body 92a, a lid 92b, a supply port 92c, and a shutter 92d.

For example, the body 92a has a generally rectangular parallelepiped shape, with an open top end. This allows the cartridge 91 to be inserted and stored from above the body 92a. However, the side end of the body 92a may be opened, for example. In such a case, the cartridge 91 may be inserted and stored from the side of the body 92a.

The lid 92b is removably and hermetically attached to the top end of the body 92a via a sealing member 92e, such as an O-ring. The lid 92b opens and closes the top end opening of the body 92a. The body 92a and the lid 92b serve as a housing for storing the cartridge 91.

The supply port 92c is an aperture for supplying the powder R1 in the cartridge 91 stored in the housing formed of the body 92a and the lid 92b, into the container 21 of the feeder 20.

The shutter 92d is, for example, a plate-like member capable of opening and closing the supply port 92c. When the shutter 92d is opened, the housing communicates with the container 21 of the feeder 20 through the supply Port 92c. Meanwhile, when the shutter 92d is closed, communication between the housing and the container 21 of the feeder 20 is interrupted.

An enclosed space S within the replenishing unit 92 is capable of being pressurized. The enclosed space S is purged with, for example, argon gas. This allows the container 21 of the feeder 20 to be refilled with powder R1 in the cartridge 91 without reacting the powder R1 with moisture, nitrogen and oxygen. Therefore, it is possible to improve stability of film quality of the thermal sprayed film using the powder R1. Argon gas supplied from the gas supply source 41 passes through a pipe 44 through which a valve 47 is interposed, and is supplied into the replenishing unit 92, from a port 92f provided in the replenishing unit 92. However, the argon gas may be supplied from a source separate from the gas supply source 41. It should be noted that a gas filled into the interior of the replenishing unit 92 is not limited to argon gas, and may be any inert gas, such as helium gas. The replenishing unit 92 may also be configured such that the interior of the replenishing unit 92 can be evacuated with an exhaust mechanism (not illustrated).

(Collection/Disposal Mechanism)

Figure 3:
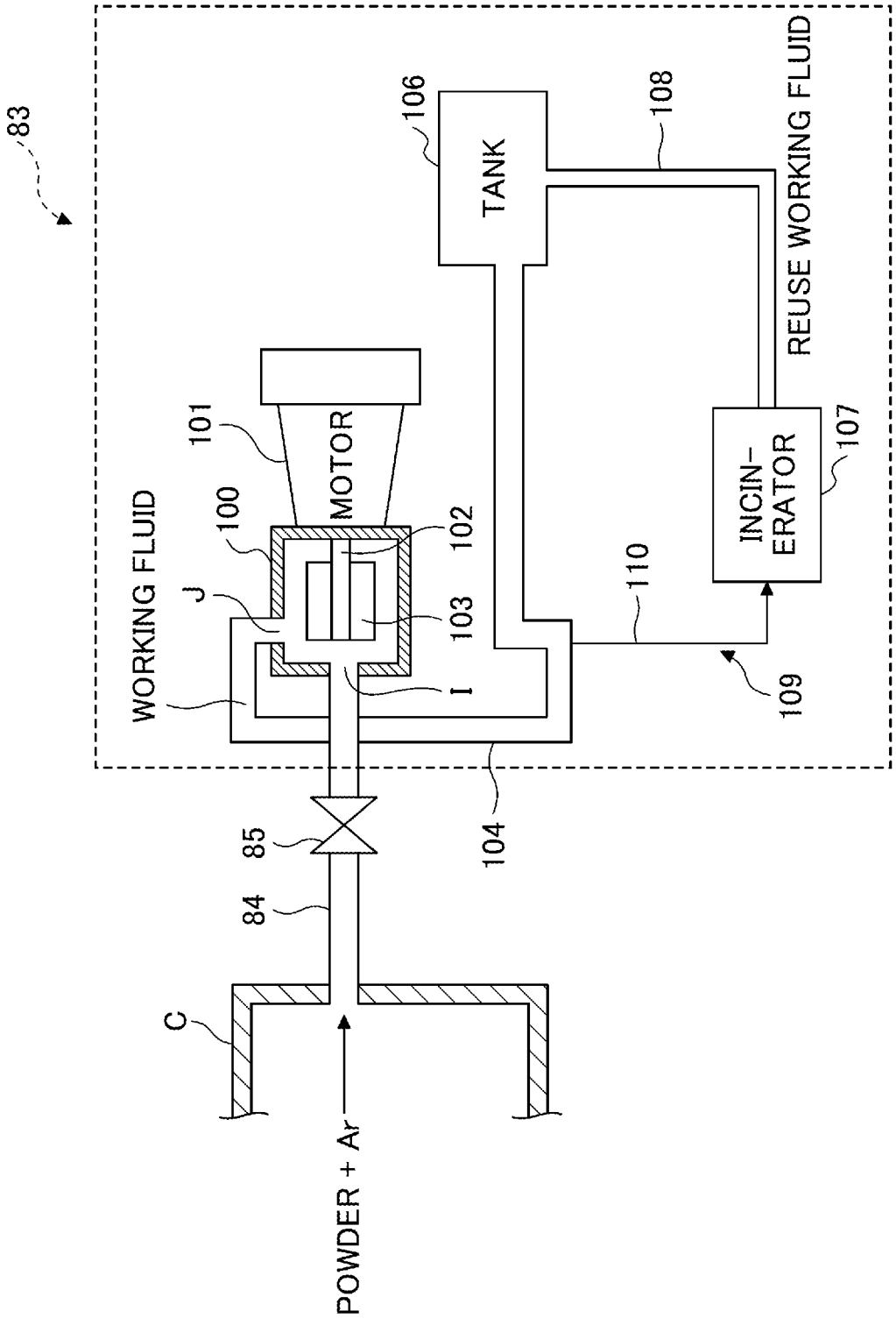
FIG. 3 is a diagram illustrating a collection/disposal mechanism of the plasma spraying apparatus of FIG. 1.

The collection/disposal mechanism 83 will be described with reference to FIG. 3. FIG. 3 is a diagram illustrating the collection/disposal mechanism 83 of the plasma spraying apparatus 1 of FIG. 1.

As illustrated in FIG. 3, the collection/disposal mechanism 83 draws argon gas and powder in the chamber C through an exhaust pipe 84 by opening and closing a valve 85, and discards the powder. The collection/disposal mechanism 83 includes a liquid seal pump 100, a motor 101, an impeller 103, a pipe 104, a tank 106, a pipe 108, and a disposal mechanism 109.

The liquid seal pump 100 draws thermal spraying materials that were not used for plasma spraying (hereinafter referred to as "sprayed waste") and argon gas from the inside of the chamber C, and seals the drawn sprayed waste and argon gas with a working liquid.

The liquid seal pump 100 is filled with a fluorine-based solvent or oil. In the present embodiment, water cannot be used as a working liquid used for collecting the sprayed waste to avoid combustion of the sprayed waste, and fluorine-based solvent or oil is used. The liquid seal pump 100 is also configured by a scrubber-type pump capable of drawing a gas containing the sprayed waste. For example, because it is presumed that a turbomolecular pump or a dry pump may malfunction when a gas containing a solid sprayed waste is drawn, it is difficult to use a turbomolecular pump or a dry pump in the present embodiment. The pump flow rate of the liquid seal pump 100 may be, for example, between 800 L/min and 1200 L/min.

The liquid seal pump 100 rotates a shaft 102 by power of the motor 101 to rotate the impeller 103. This allows the sprayed waste and argon gas from the chamber C to pass through the exhaust pipe 84 and the opened valve 85, be drawn into the pump from an intake port I, and be sealed with the working liquid. The working liquid, with the sprayed waste and argon gas sealed, is transferred from an outlet J to the tank 106, through the pipe 104.

The disposal mechanism 109 includes a filtration section 110 and an incinerator 107 to discard the sprayed waste. The filtration section 110 extracts the sprayed waste with a filter or the like. The sprayed waste extracted at the filtration section 110 needs to be disposed of so as not to ignite because of moisture or the like.

Accordingly, the incinerator 107 incinerates and disposes of the extracted sprayed waste. The working liquid from which the sprayed waste has been removed is returned to the tank 106 through the pipe 108, and is reused as the working liquid of the liquid seal pump 100. In the collection/disposal mechanism 83 according to the present embodiment, the sprayed waste can be discarded safely without causing ignition by moisture. In addition, heat used for the disposal and the working liquid can be reused.

(Dry Chamber)

The dry chamber 88 is provided adjacent to the chamber C, and forms an enclosed region dehumidified to a predetermined humidity. The dry chamber 88 is also depressurized to a predetermined pressure by an exhaust device 89. However, the dry chamber 88 may not be depressurized.

The substrate W after deposition is conveyed to the dry chamber 88, and is conveyed to a next process. In order to prevent the thermal sprayed film F1 from being reacted with nitrogen or oxygen as much as possible while the substrate W after deposition is conveyed, the substrate W after deposition is immediately loaded into the dry chamber 88 from gate valves 86 and 87.

(Controller)

The plasma spraying apparatus 1 includes the controller 30. The controller 30 controls the plasma spraying apparatus 1. Specifically, the controller 30 controls the gas supply source 41, the feeder 20 (actuator 22), the DC power supply 50, the chiller unit 70, the collection/disposal mechanism 83, the powder feeding mechanism 90, and the like.

The controller 30 includes a CPU (Central Processing Unit), a ROM (Read Only Memory), a RAM (Random Access Memory), and an HDD (Hard Disk Drive). The CPU selects a program (recipe) for depositing a thermal spraying material of a specific metal by plasma spraying, and sets the program (recipe) to the RAM. The CPU transmits control signals to each unit based on the program stored in the RAM. Accordingly, a thermal sprayed film F1 having desired characteristics can be thermal sprayed on the substrate W. Note that functions of the controller 30 may be implemented using software or may be implemented using hardware.

(Operation of Spraying Apparatus)

An example of the operation (thermal spraying method) of the plasma spraying apparatus 1 according to the first embodiment will be described with reference to FIGS. 4 to 7. In the operation of the plasma spraying apparatus 1 described below, the opening and closing of the valve 47, the opening and closing of the shutter 91b, the opening and closing of the shutter 92d, and the operation of the ejecting mechanism 91c are performed by the controller 30, for example. FIGS. 4 to 7 are a set of diagrams illustrating an example of the operation of the plasma spraying apparatus 1. In FIGS. 4 to 7, the valve 47 colored in white indicates that the valve 47 is in an opened state, and the valve 47 colored in black indicates that the valve 47 is in a closed state.

First, in a dry box located in an environmentally controlled dry booth, the cartridge 91 is filled with powder R1 from an airtight storage container. In the present embodiment, the shutter 91b of the cartridge 91 is opened in the dry box, and the powder R1 is filled into the cartridge 91 from the port 91a. This prevents the powder R1, prior to be filled into the cartridge 91, from reacting with moisture, oxygen, and nitrogen. An opening other than the port 91a may be provided in the cartridge 91, and the powder R1 may be filled into the cartridge 91 from the opening. In this case, a shutter that can hermetically seal the opening may be provided. Subsequently, after filling of powder R1 is complete, the shutter 91b is closed, and the cartridge 91 is taken out of the dry box. This prevents the powder R1 filled in the cartridge 91 from reacting with moisture, oxygen and nitrogen even if the cartridge 91 is removed from the dry box into the atmosphere.

Figure 4:
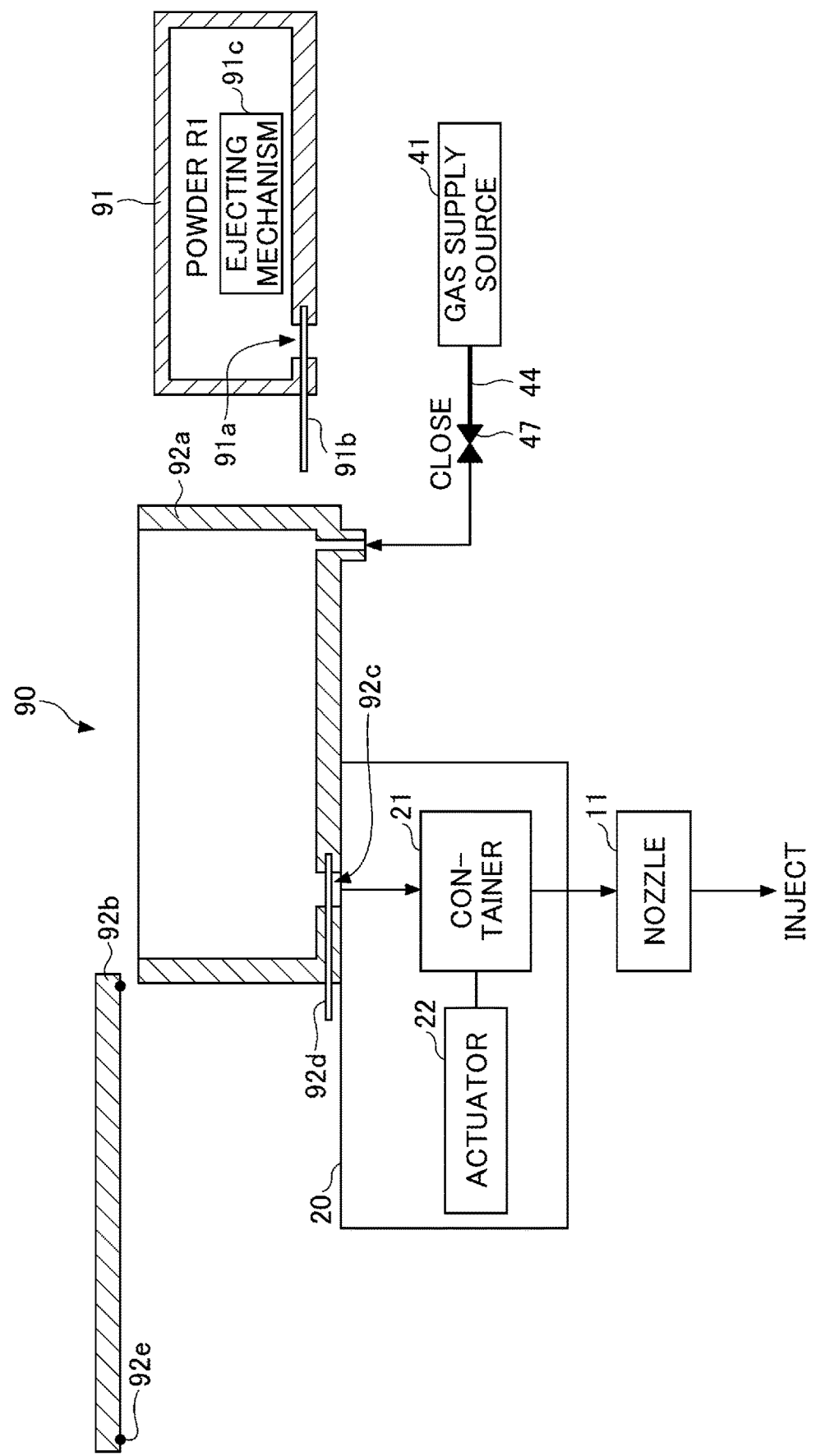
FIG. 4 is a diagram (1) illustrating an example of an operation of the plasma spraying apparatus.

Then, as illustrated in FIG. 4, the lid 92b is removed from the body 92a, with the shutter 92d of the replenishing unit 92 closed. This interrupts communication between the housing of the replenishing unit 92 and the container 21 of the feeder 20, thereby preventing the interior of the container 21 of the feeder 20 from being exposed to the atmosphere during replacement of the cartridge 91, and preventing the powder R1 in the container 21 from reacting with moisture, oxygen, and nitrogen. Therefore, it is possible to replace the cartridge 91 without stopping the operation of the plasma spraying including operations of inserting the powder R1 into the nozzle 11 from the feeder 20, melting the inserted powder R1, and depositing a film on the substrate W using the molten powder R1.

Figure 5:
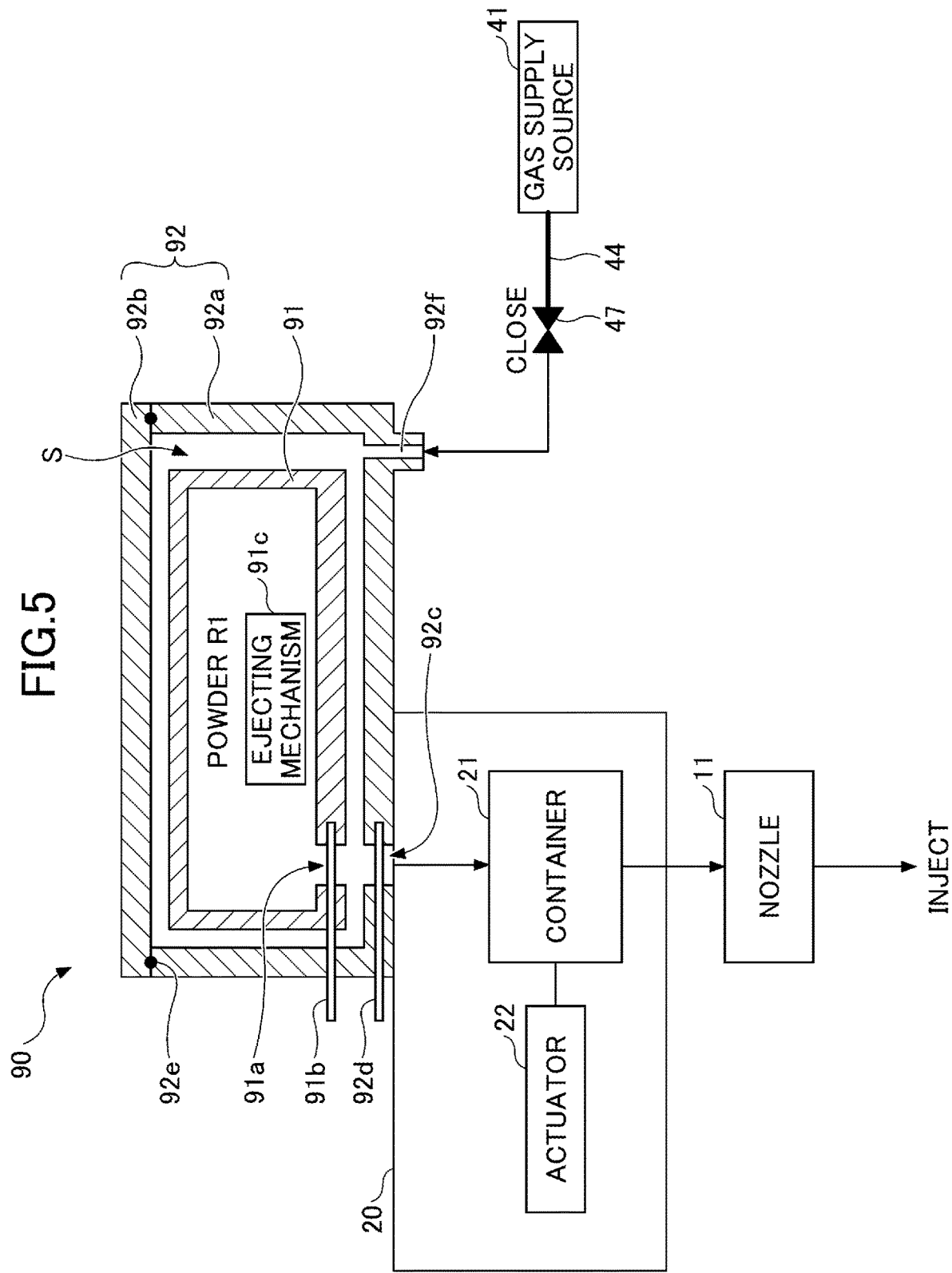
FIG. 5 is a diagram (2) illustrating the example of the operation of the plasma spraying apparatus.

Subsequently, as illustrated in FIG. 5, the cartridge 91 filled with the powder R1 is inserted into and attached to the body 92a. Also, the lid 92b is attached to the body 92a to make the interior of the replenishing unit 92 airtight. If a used cartridge 91 is attached to the body 92a, after the used cartridge 91 is removed, the cartridge 91 filled with powder R1 is inserted into and attached to the body 92a.

Figure 6:
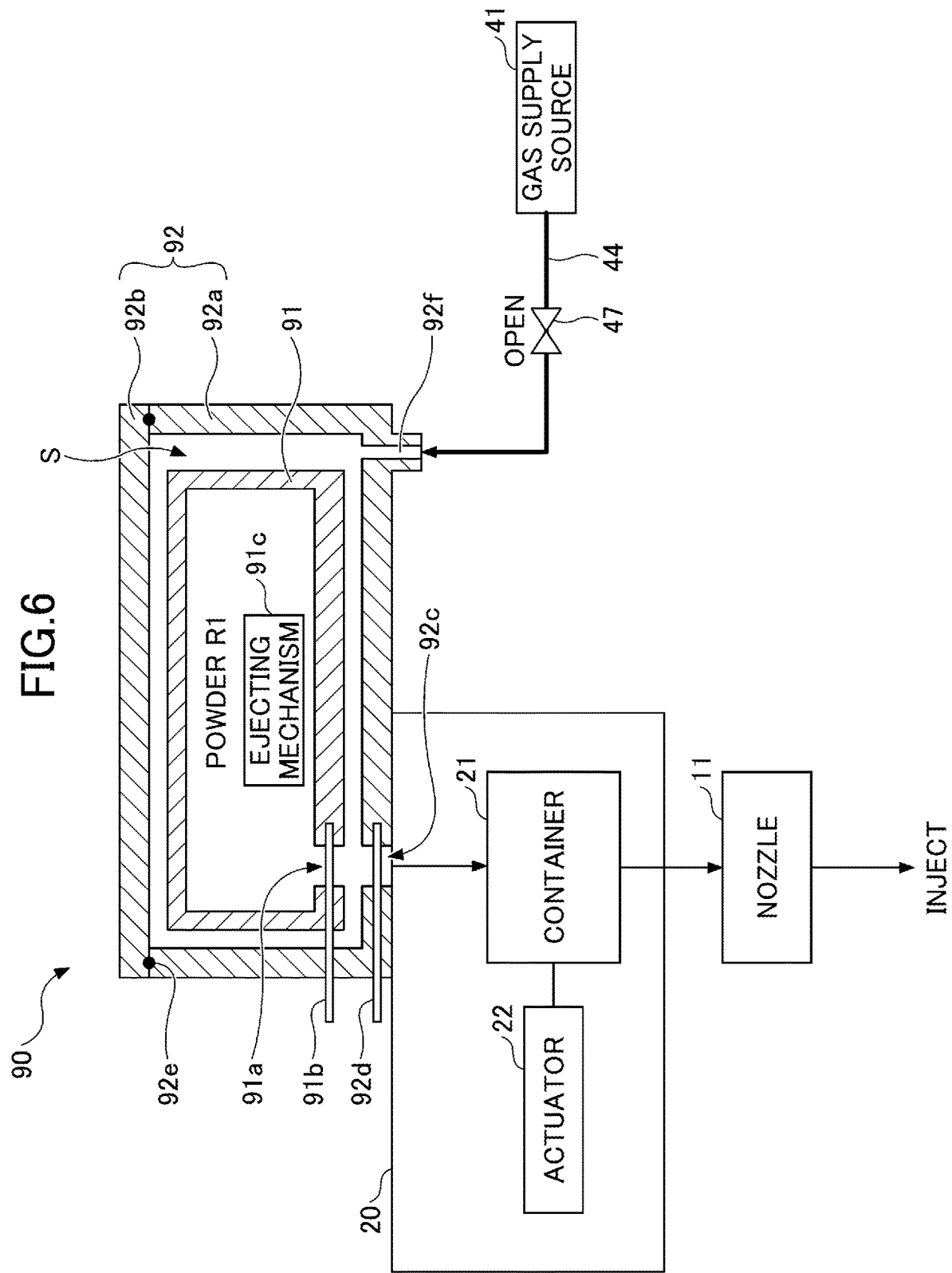
FIG. 6 is a diagram (3) illustrating the example of the operation of the plasma spraying apparatus.

Then, as illustrated in FIG. 6, the valve 47 is opened and the replenishing unit 92 is filled with argon gas from the gas supply source 41 via the pipe 44, to purge the replenishing unit 92 with argon gas.

Figure 7:
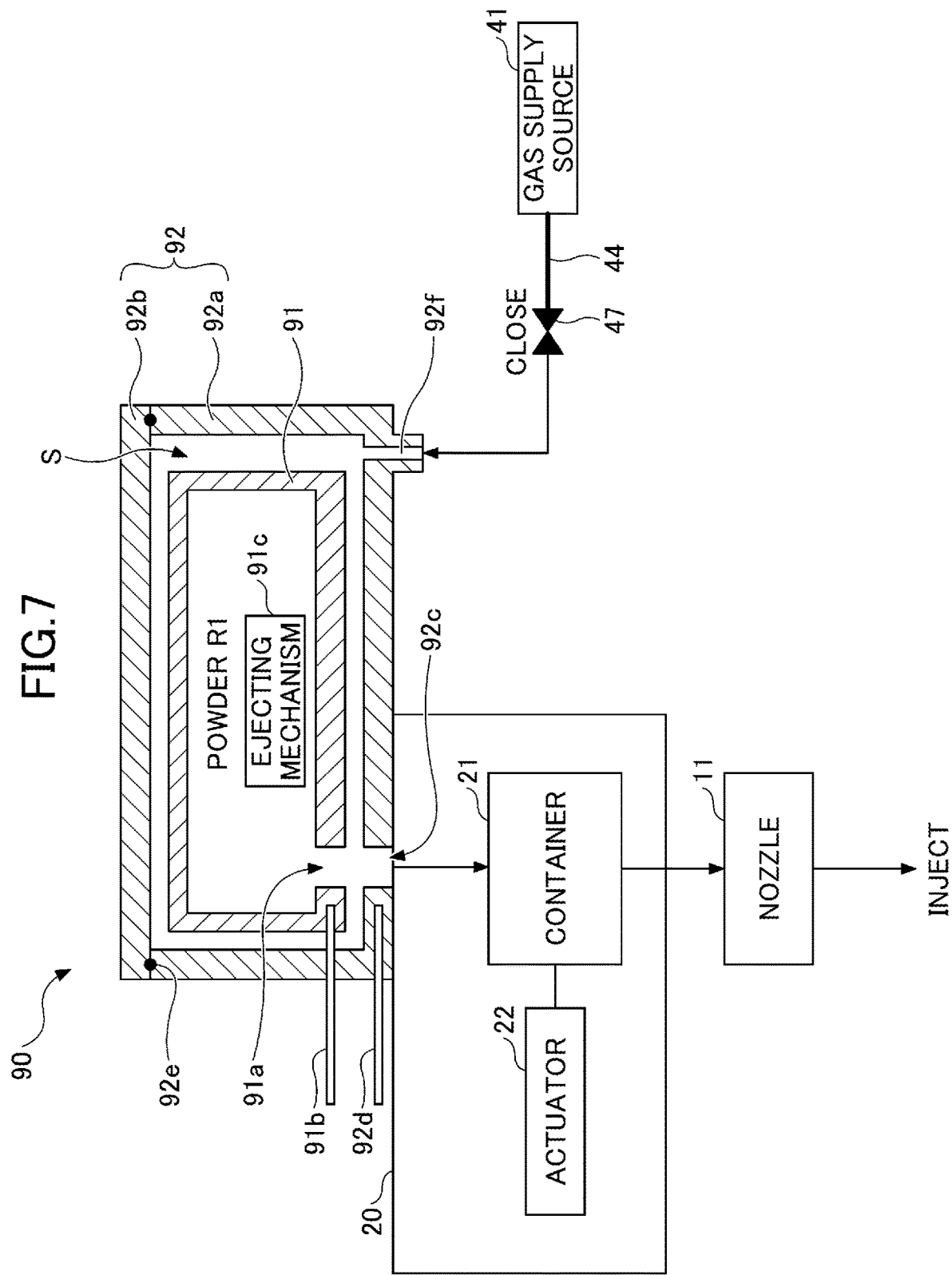
FIG. 7 is a diagram (4) illustrating the example of the operation of the plasma spraying apparatus.

Then, as illustrated in FIG. 7, after closing the valve 47 to stop filling the replenishing unit 92 with argon gas from the gas supply source 41, the shutter 91b and the shutter 92d are opened to cause the interior of the cartridge 91 to be in communication with the interior of the container 21. The powder R1 in the cartridge 91 is then ejected by the ejecting mechanism 91c to refill the container 21. At this time, because argon gas is filled in the cartridge 91, in the replenishing unit 92 and in the container 21, the powder R1 is prevented from reacting with water, oxygen and nitrogen when refilling the container 21 of the feeder 20 with the powder R1 in the cartridge 91. When the shutter 91b and the shutter 92d are opened to cause the interior of the cartridge 91 to be in communication with the container 21, filling of the argon gas from the gas supply source 41 into the replenishing unit 92 may continue without closing the valve 47.

As described above, according to the plasma spraying apparatus 1 in the first embodiment, the cartridge 91 storing the powder R1 in an airtight state is attached to the replenishing unit 92, and the powder R1 is supplied from the cartridge 91 to the feeder while maintaining the airtight state. This allows the powder R1 in the cartridge 91 to be refilled into the container 21 of the feeder 20 without reacting with moisture, nitrogen and oxygen. Therefore, it is possible to improve the stability of the film quality of the spraying film using the powder R1.

Furthermore, the cartridge 91 is replaced by removing the lid 92b from the body 92a, while the shutter 92d of the replenishing unit 92 is closed. This prevents the interior of the container 21 of the feeder 20 from being exposed to the atmosphere during replacement of the cartridge 91, and prevents the powder R1 in the container 21 from reacting with moisture, oxygen, and nitrogen. Therefore, it is possible to replace the cartridge 91 without stopping the operation of the plasma spraying including operations of inserting the powder R1 into the nozzle 11 from the feeder 20, melting the inserted powder R1, and depositing a film on the substrate W using the molten powder R1.

Incidentally, in a case in which powder R1 is fine powder whose median particle diameter is between 1 µm and 20 µm, as the surface area per unit volume is larger than that of commonly used powder having a median particle diameter between 50 µm and 100 µm, the powder R1 easily reacts with water, oxygen and nitrogen when the powder R1 is exposed to the atmosphere. Thus, when replenishing the feeder 20 with powder in the atmosphere, the powder R1 may react with water, oxygen, and nitrogen, and may agglomerate. If powder R1 agglomerates, because the powder R1 does not melt easily, the quality of the thermal sprayed film deteriorates. Therefore, in the plasma spraying apparatus 1 according to the first embodiment, the environment in the feeder 20, the nozzle 11, and the chamber C is controlled, and the environment in which the powder R1 is not exposed to the atmosphere is also realized when the feeder 20 is replenished with the powder R1 by the powder feeding mechanism 90. This prevents deterioration of the film quality of the thermal sprayed film due to agglomeration of the powder R1 when the powder R1 is supplied to the feeder 20.

First Variation

Figure 8:
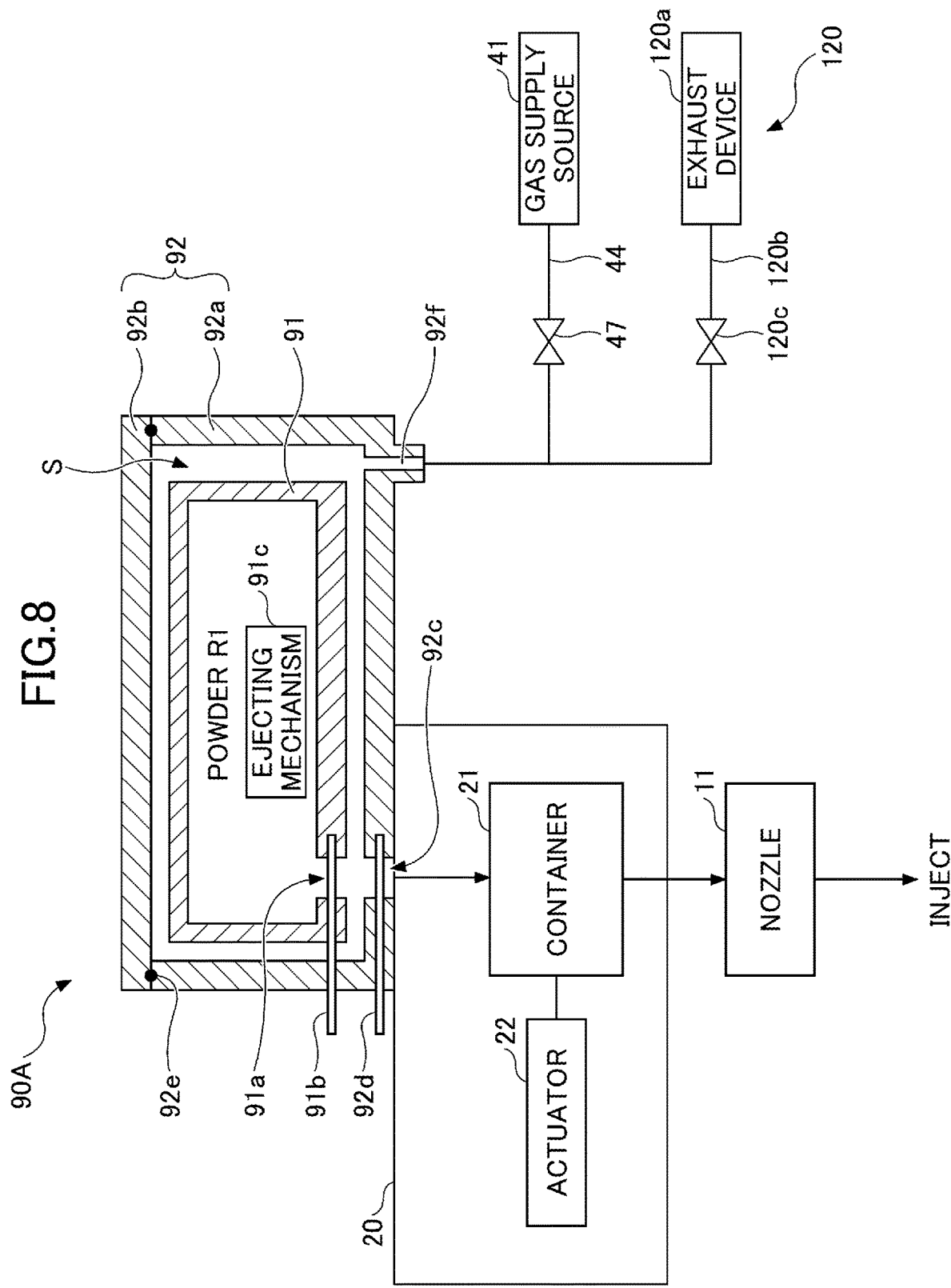
FIG. 8 is a diagram illustrating a powder feeding mechanism in a first variation.

A first variation of the powder feeding mechanism will be described with reference to FIG. 8. FIG. 8 is a diagram illustrating a powder feeding mechanism according to the first variation.

As illustrated in FIG. 8, the powder feeding mechanism 90A according to the first variation differs from the powder feeding mechanism 90 in that the powder feeding mechanism 90A includes an exhaust mechanism 120 that evacuates the inside of the replenishing unit 92. Other configurations of the powder feeding mechanism 90A may be similar to those of the powder feeding mechanism 90. Hereinafter, different points will be mainly explained.

The exhaust mechanism 120 evacuates the inside of the replenishing unit 92 (enclosed space S) through the port 92f. The exhaust mechanism 120 includes an exhaust device 120a, an exhaust pipe 120b, and a valve 120c. The exhaust device 120a may be, for example, a vacuum pump. As the exhaust device 120a, the exhaust device 89 (see FIG. 1) for depressurizing the dry chamber 88 may be used. The exhaust pipe 120b connects the exhaust device 120a to the port 92f. The valve 120c is provided in the middle of the exhaust pipe 120b. In the exhaust mechanism 120, by opening the valve 120c, the port 92f communicates with the exhaust device 120a, and the exhaust device 120a evacuates the inside of the replenishing unit 92 (enclosed space S).

According to the first variation, because the exhaust mechanism 120 is provided to evacuate the inside of the replenishing unit 92, the time required for purging the interior of the replenishing unit 92 can be reduced by the combination of (or the switching between) the supply of argon gas into the replenishing unit 92 and the evacuation within the replenishing unit 92.

Second Variation

Figure 9:
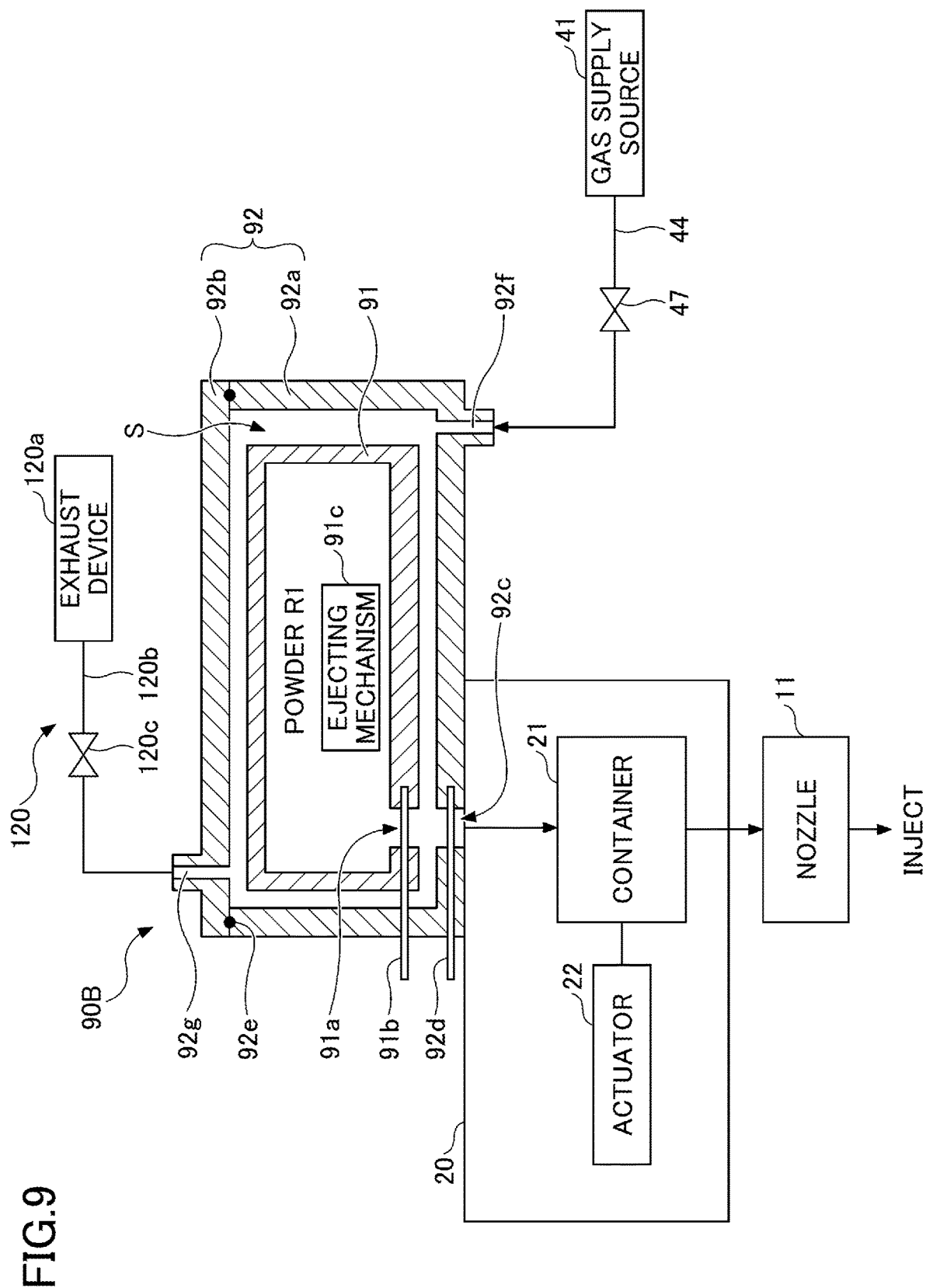
FIG. 9 is a diagram illustrating a powder feeding mechanism in a second variation.

A second variation of the powder feeding mechanism will be described with reference to FIG. 9. FIG. 9 is a diagram illustrating a powder feeding mechanism according to the second variation.

As illustrated in FIG. 9, the powder feeding mechanism 90B of the second variation differs from the powder feeding mechanism 90A of the first variation in that the exhaust mechanism 120 evacuates the inside of the replenishing unit 92 (enclosed space S) through a port 92g provided separately from the port 92f. Other configurations may be similar to those of the powder feeding mechanism 90A. Hereinafter, different points will be mainly explained.

According to the second variation, because the two ports 92f and 92g are provided, argon gas can be supplied to the replenishing unit 92 via the port 92f while evacuating the replenishing unit 92 via the port 92g. As a result, the time required for purging within the replenishing unit 92 can be reduced.

Third Variation

Figure 10:
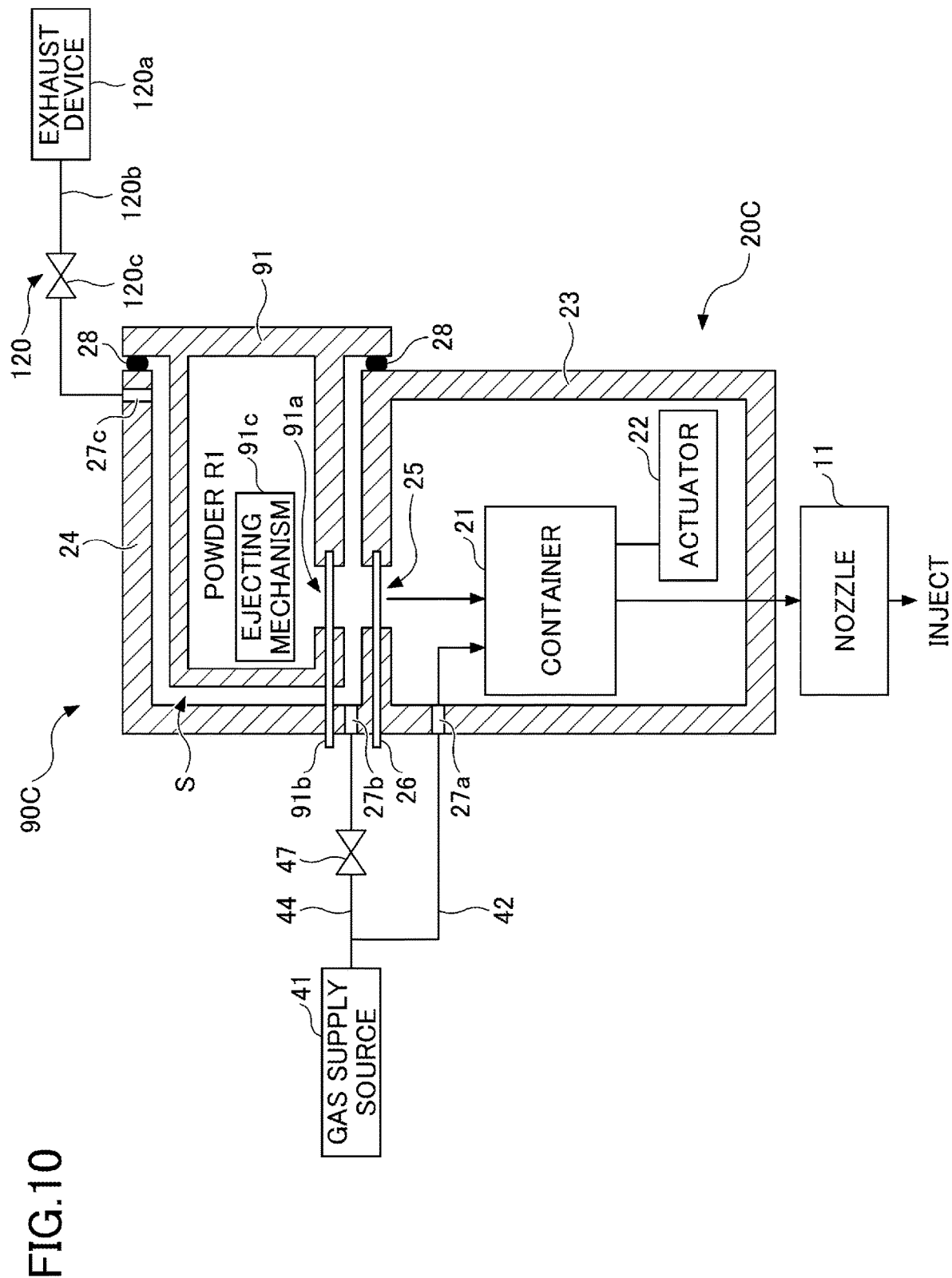
FIG. 10 is a diagram illustrating a powder feeding mechanism in a third variation.

A third variation of the powder feeding mechanism will be described with reference to FIG. 10. FIG. 10 is a diagram illustrating a powder feeding mechanism according to the third variation.

As illustrated in FIG. 10, the powder feeding mechanism 90C according to the third variation differs from the powder feeding mechanism 90 in that the replenishing unit 92 illustrated in FIG. 2 is formed integrally with the feeder 20. In other words, part of the feeder 20C serves as the replenishing unit 92. In other respects, the configurations may be the same as those of the powder feeding mechanism 90. Hereinafter, different points will be mainly explained.

The feeder 20C includes a main body 23, a connection portion 24, a supply port 25, and a shutter 26.

The main body 23 forms part of a casing, and accommodates the container 21 and the actuator 22. Inside the container 21, argon gas is supplied from the gas supply source 41 via the pipe 42 and a port 27a.

The connection portion 24 forms part of the casing, and the cartridge 91 is removably connected. The connection portion 24 is provided above the main body 23. The cartridge 91 is detachably and hermetically attached to the connection portion 24 via a sealing member 28, such as an O-ring. When the cartridge 91 is connected to the connection portion 24, the connection portion 24 and the cartridge 91 form an enclosed space S between the supply port 25 and the port 91a. Argon gas is supplied to the enclosed space S from the gas supply source 41 via the pipe 44 and the port 27b. Also, the enclosed space S is evacuated by the exhaust device 120a via a port 27c and the exhaust pipe 120b. Thus, the enclosed space S is purged by the supply of argon gas from the gas supply source 41 and by the evacuation using the exhaust device 120a. Note that the supply of argon gas to the enclosed space S and the evacuation of the enclosed space S may be performed through a single port, as described with reference to FIG. 8.

The supply port 25 is an opening for replenishing the feeder 20C with powder R1 in the cartridge 91 connected to the connection portion 24. The supply port 25 is formed on the top surface of the main body 23, and is provided at a position corresponding to the port 91a, with the cartridge 91 connected to the connection portion 24.

The shutter 26 is, for example, a plate-like member capable of opening and closing the supply port 25. When the shutter 26 is opened, the enclosed space S communicates with the container 21 of the feeder 20C through the supply port 25. Meanwhile, when the shutter 26 is closed, communication between the enclosed space S and the container 21 of the feeder 20C is interrupted.

According to the third variation, because the replenishing unit 92 is formed integrally with the feeder 20C, the structure is simple.

Fourth Variation

Figure 11:
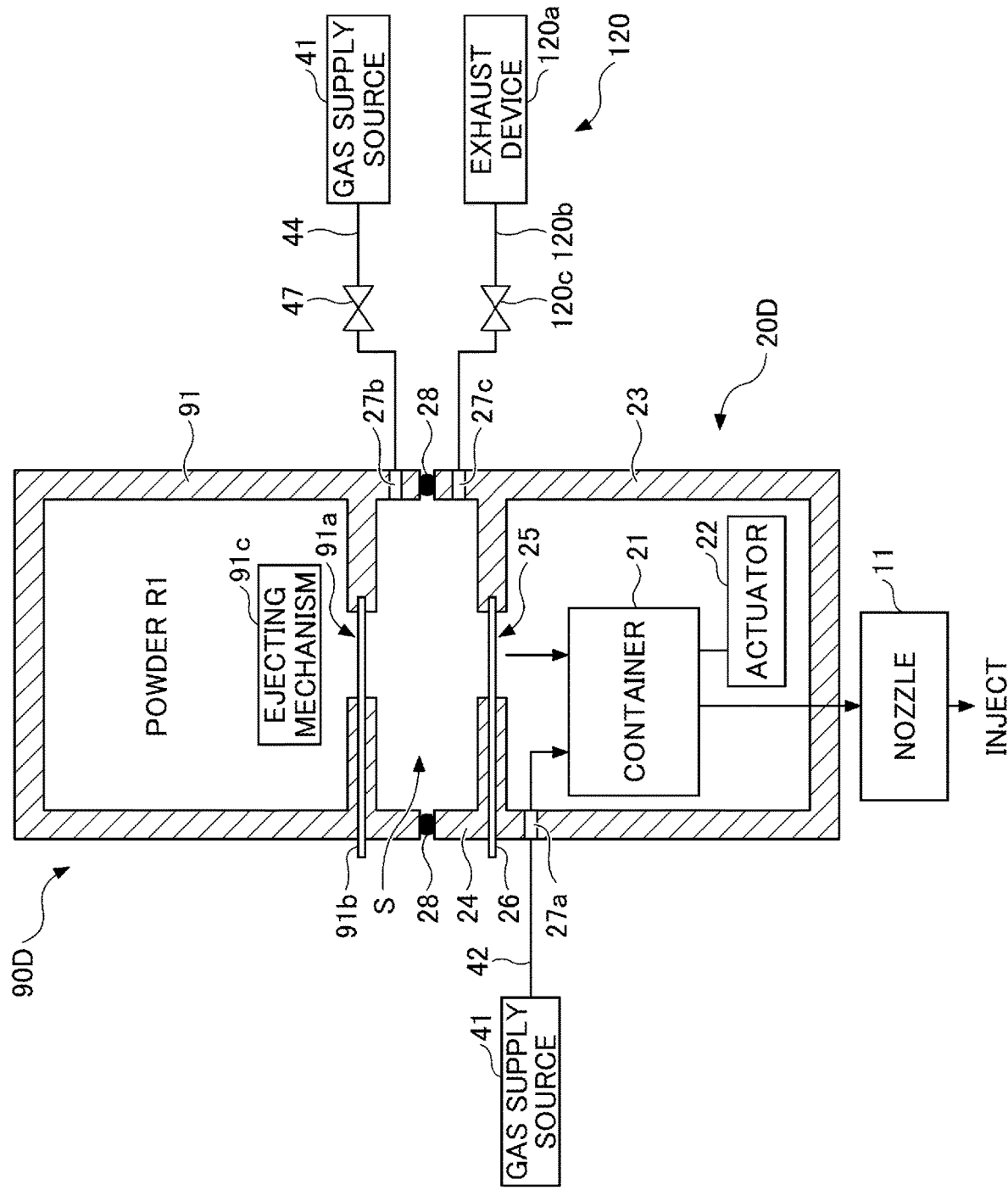
FIG. 11 is a diagram illustrating a powder feeding mechanism in a fourth variation.

A fourth variation of the powder feeding mechanism will be described with reference to FIG. 11. FIG. 11 is a diagram illustrating the powder feeding mechanism according to the fourth variation.

As illustrated in FIG. 11, the powder feeding mechanism 90D of the fourth variation differs from the powder feeding mechanism 90C of the third variation in that the cartridge 91 is connected to form an enclosed space S above the feeder 20D. Other configurations may be the same as the powder feeding mechanism 90C. In the example illustrated in FIG. 11, a port 27b for supplying argon gas from the gas supply source 41 to the enclosed space S is formed in the cartridge 91, but the port 27b may be formed in the connection portion 24 as well as the port 27c.

According to the fourth variation, because the cartridge 91 is connected so as to form the enclosed space S above the feeder 20D, the fourth variation produces an effect of supplying a large amount of powder at one time.

Fifth Variation

Figure 12:
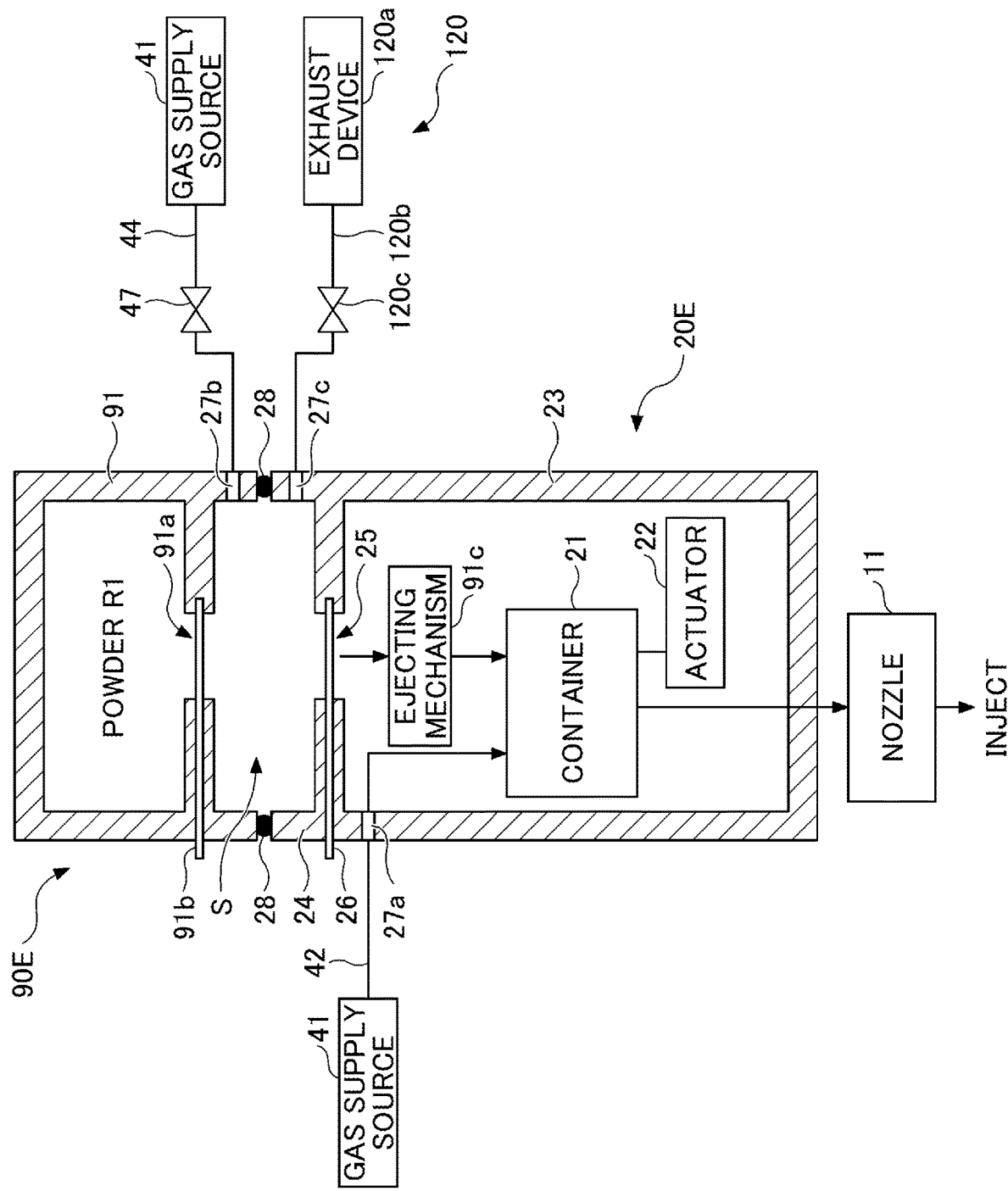
FIG. 12 is a diagram illustrating a powder feeding mechanism in a fifth variation.

A fifth variation of the powder feeding mechanism will be described with reference to FIGS. 12 to 16. FIG. 12 is a diagram illustrating the powder feeding mechanism according to the fifth variation.

As illustrated in FIG. 12, the powder feeding mechanism 90E of the fifth variation differs from the powder feeding mechanism 90D of the fourth variation in that the ejecting mechanism 91c is not provided in the cartridge 91 and is provided in the feeder 20E. Other configurations may be similar to those of the powder feeding mechanism 90D.

Figure 13:
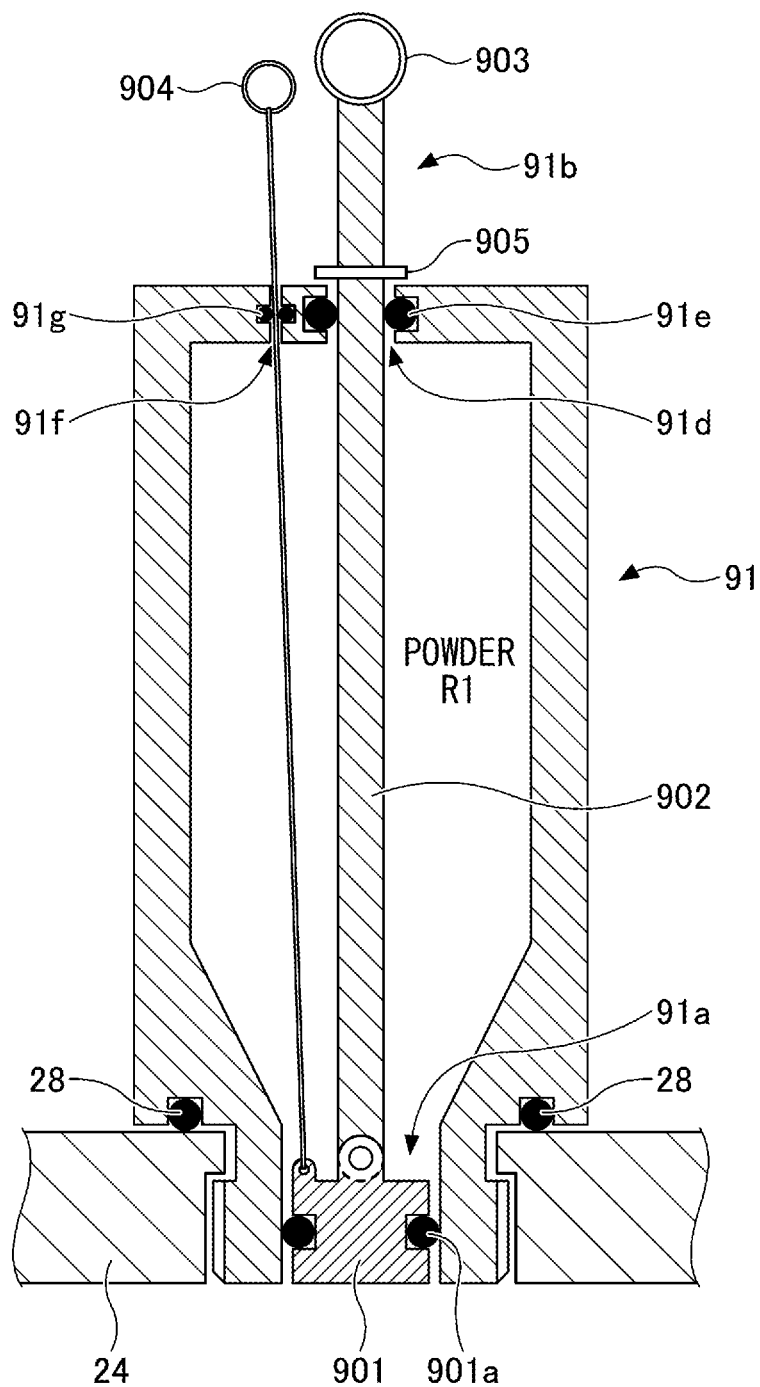
FIG. 13 is a diagram illustrating another configuration example of a shutter in the powder feeding mechanism in FIG. 12.
Figure 14:
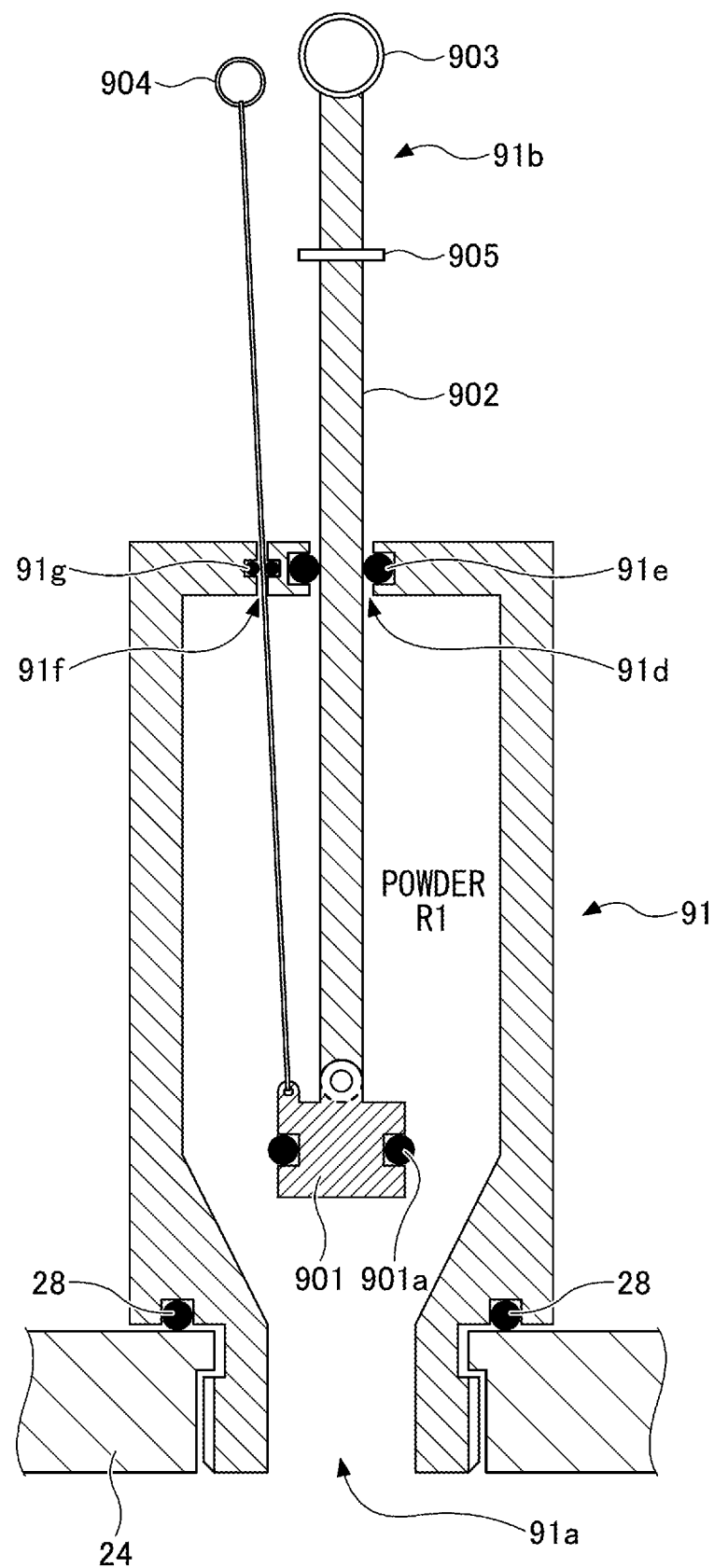
FIG. 14 is a diagram (1) illustrating an operation of the shutter in FIG. 13.
Figure 15:
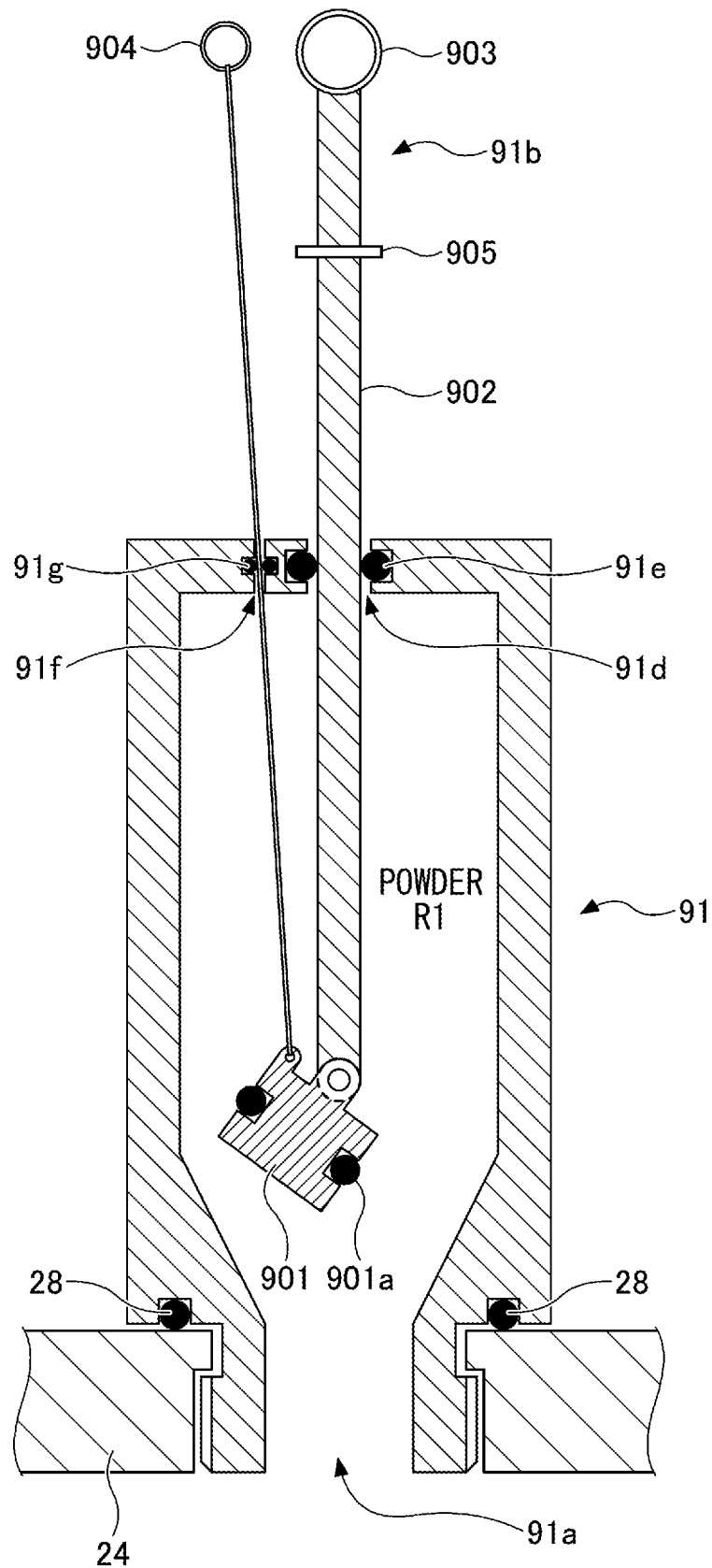
FIG. 15 is a diagram (2) illustrating the operation of the shutter in FIG. 13.
Figure 16:
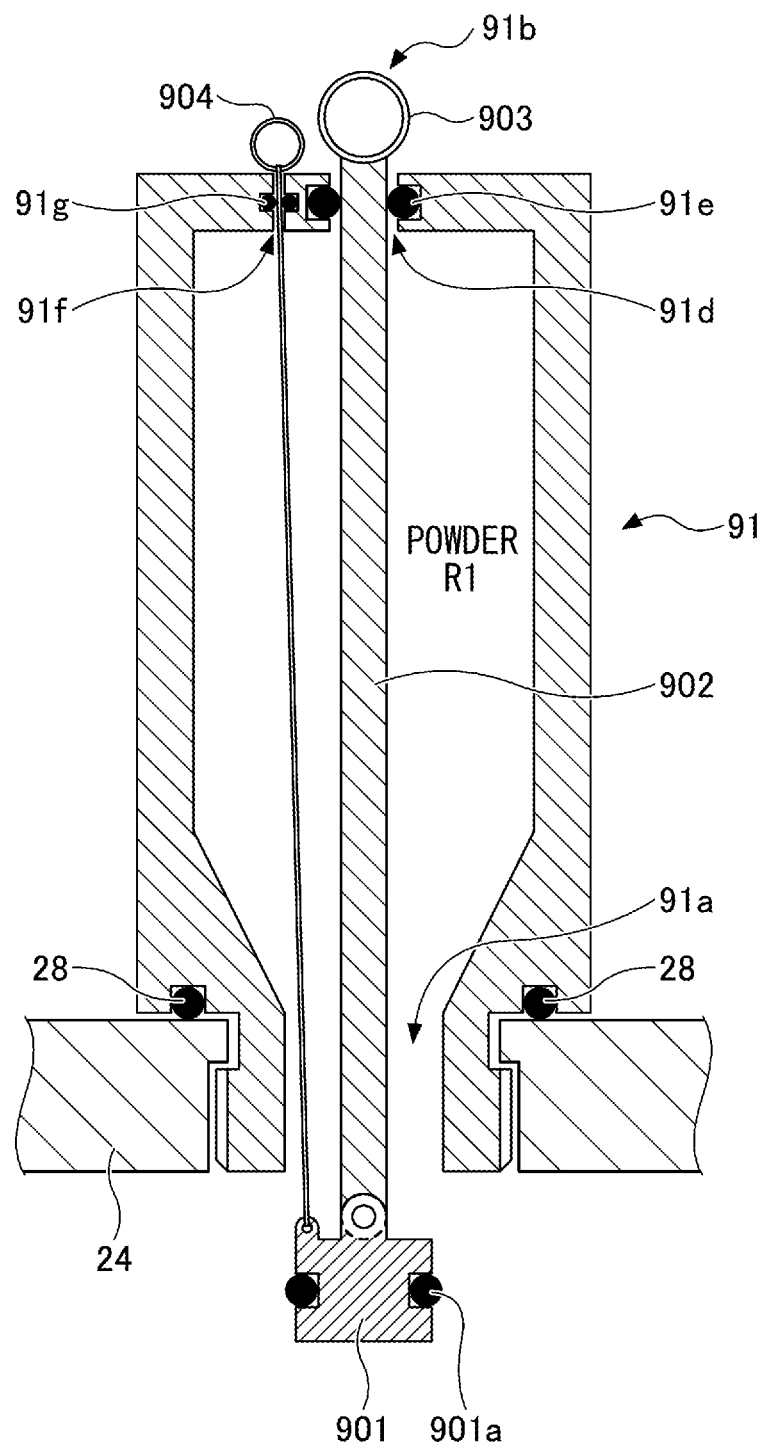
FIG. 16 is a diagram (3) illustrating the operation of the shutter in FIG. 13.

FIG. 13 is a diagram illustrating another configuration example of the shutter 91b of the powder feeding mechanism 90E in FIG. 12. FIGS. 14 to 16 are views illustrating an operation of the shutter 91b illustrated in FIG. 13.

As illustrated in FIG. 13, the shutter 91b includes a valve body 901, a shaft 902, a knob 903, a valve tilting mechanism 904, and a locking mechanism 905.

The valve body 901 is provided with a sealing member 901a, such as an O-ring, so as to seal the port 91a airtightly. The valve body 901 is rotatably attached to the lower end of the shaft 902. The valve tilting mechanism 904 is attached to the valve body 901. By operating the valve tilting mechanism 904, the valve body 901 is rotated and can be tilted with respect to the shaft 902.

The shaft 902 is a rod-like member extending from the interior of the cartridge 91 to the exterior via a penetrating portion 91d penetrating the interior and exterior of the cartridge 91. A sealing member 91e, such as an O-ring, is provided in the penetrating portion 91d to support the shaft 902 while the shaft 902 is sealed airtightly, such that the shaft 902 can be moved in the longitudinal direction. The valve body 901 is rotatably attached to the lower end of the shaft 902, and the knob 903 is attached to the upper end of the shaft 902. For example, as illustrated in FIG. 14, when the shaft 902 is moved upward by pulling the knob 903 upward, the valve body 901 moves upward in conjunction with the shaft 902, and the port 91a having been hermetically sealed with the valve body 901 is opened. Also, for example, as illustrated in FIG. 15, when the valve tilting mechanism 904 is pulled upward while the valve body 901 and the shaft 902 have been moved upward, the valve body 901 rotates relative to the shaft 902 and tilts. For example, as illustrated in FIG. 16, when the shaft 902 is moved downward, the valve body 901 moves downward in conjunction with the shaft 902, and the port 91a having been hermetically sealed with the valve body 901 is opened.

The knob 903 is attached to the upper end of the shaft 902, and is formed of, for example, a ring-like member. The knob 903 is used to move the shaft 902 upward or downward. By pulling the knob 903 upward, the shaft 902 moves upward in conjunction with the knob 903. The knob 903 may be operated by an operator, or may be operated by an automatically-controlled arm or the like.

The valve tilting mechanism 904 is a rod-like member extending from the interior of the cartridge 91 to the exterior via a penetrating portion 91f penetrating the interior and exterior of the cartridge 91, to adjust the angle of the valve body 901 relative to the shaft 902. A sealing member 91g, such as an O-ring, is provided in the penetrating portion 91f, to support the valve tilting mechanism 904 such that the valve tilting mechanism 904 can be moved, while the valve tilting mechanism 904 is sealed airtightly. The valve body 901 is attached to the lower end of the valve tilting mechanism 904, and the upper end of the valve tilting mechanism 904 protrudes above the cartridge 91. By pulling the upper end of the valve tilting mechanism 904 upward, or by pushing the upper end of the valve tilting mechanism 904 downward, the valve body 901 rotates relative to the shaft 902, and tilts.

The locking mechanism 905 locks downward movement of the shaft 902. This prevents the valve body 901 from moving out of the cartridge 91, and prevents the port 91a having been hermetically sealed with the valve body 901 from being opened. The locking mechanism 905 may be, for example, a locking pin capable of being inserted in the shaft 902 by penetrating the shaft 902 in the radial direction of the shaft 902, and capable of being pulled out from the shaft 902.

When the cartridge 91 having the above-described shutter 91b is to be filled with the powder R1, the cartridge 91 is held first such that the valve body 901 of the cartridge 91 faces upward. Subsequently, as illustrated in FIG. 16, the valve body 901 is moved outside the cartridge 91 to open the port 91a. The powder R1 is then filled into the cartridge 91 from the port 91a. After completing filling the cartridge 91 with the powder R1, the port 91a is airtightly sealed with the valve body 901 by moving the valve body 901 to the position of the port 91a.

When the powder R1 filled in the cartridge 91 is supplied to the feeder 20E, the cartridge 91 is first connected to the connection portion 24 of the feeder 20E while the port 91a of the cartridge 91 is facing downward, as illustrated in FIG. 13, to form the enclosed space S. The enclosed space S is then purged, and after the purge of the enclosed space S is completed, the shutter 26 is opened. Next, after the valve body 901 is moved upward to open the port 91a (see FIG. 14), the valve body 901 is rotated relative to the shaft 902 to tilt (see FIG. 15). Thus, the powder R1 in the cartridge 91 is supplied to the feeder 20E via the port 91a, the enclosed space S, and the supply port 25. At this time, because the valve body 901 tilts relative to the shaft 902, the powder R1 in the cartridge 91 can be smoothly supplied into the feeder 20E. In addition, it is possible to prevent powder R1 from remaining on the valve body 901.

According to the fifth variation, because the ejecting mechanism 91c is not provided in the cartridge 91 but is provided in the feeder 20, the component configuration of the cartridge 91 can be simplified, resulting in the cost reduction of replacement parts.

Figure 18A:
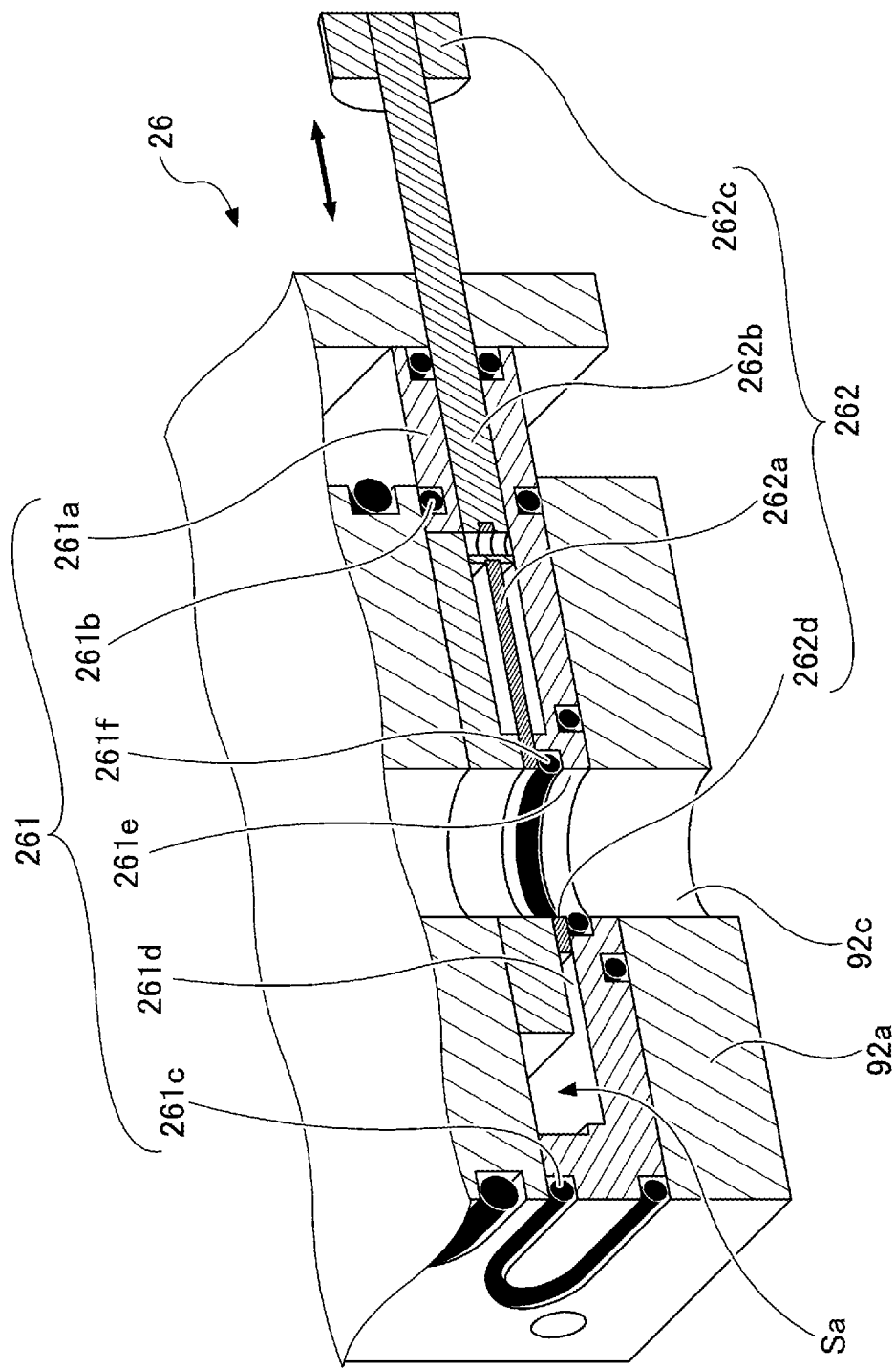
FIG. 18A is a diagram (2) illustrating the example of the configuration of the shutter provided in the feeder.

Next, a specific example of the configuration of the shutter will be described with reference to the shutter 26 provided in the feeders 20C to 20E. However, the specific example of the configuration of the shutter described below can also be applied to the shutters 91b and 92d described with reference to FIG. 2 or the like. Description will be made with reference to FIGS. 17A, 17B, 18A, and 18B. FIGS. 17A, 17B, 18A, and 18B are diagrams illustrating an example of the configuration of the shutter 26 provided in the feeder 20C of the powder feeding mechanism 900 of FIG. 10. FIGS. 17A and 17B each illustrate a state when the shutter 26 is closed. FIG. 17A is a cross-sectional view, and FIG. 17B is a plan view. FIGS. 18A and 18B each illustrate a state when the shutter 26 is opened. FIG. 18A is a cross-sectional view, and FIG. 18B is a plan view.

As illustrated in FIGS. 17A, 17B, 18A, and 18B, the shutter 26 includes a shutter housing 261 and an opening/closing slider 262.

The shutter housing 261 includes a body 261a and sealing members 261b and 261c. The body 261a is attached to the body 92a of the replenishing unit 92 via the sealing members 261b and 261c to form an enclosed space Sa. In the body 261a, for example, a generally rectangular recess 261d is formed in a plan view. On the bottom surface of the recess 261d, a through-hole 261e penetrating the body 261a is formed at a position corresponding to the supply port 92c. The inner peripheral surface of the through-hole 261e is provided with a sealing member 261f that contacts the lower surface of a sliding plate 262a, which will be described below.

The opening/closing slider 262 includes a sliding plate 262a, a shaft 262b, and a handle 262c. The sliding plate 262a is configured to slide inside the recess 261d. The sliding plate 262a slides in the recess 261d along the direction indicated by the arrow illustrated in FIG. 17A, 17B, 18A, or 18B to open and close the supply port 92c. One end of the shaft 262b is attached to the sliding plate 262a, and the other end of the shaft 262b is attached to the handle 262c. In the opening/closing slider 262 having the above-described configuration, as illustrated in FIGS. 17A and 17B, by pushing the handle 262c toward the body 261a, the sliding plate 262a is moved in the pushing direction by the shaft 262b, and the supply port 92c is closed by the sliding plate 262a. Meanwhile, as illustrated in FIGS. 18A and 18B, by pulling the handle 262c away from the body 261a, the sliding plate 262a is moved by the shaft 262b in the direction of pulling, and the supply port 92c is opened by overlapping the opening 262d of the sliding plate 262a with the supply port 92c in a plan view.

According to the shutter 26 having the above-described configuration, leakage to the outside does not occur even in the process of connecting the supply port 92c with the enclosed space S by moving the opening/closing slider 262. Therefore, there is an effect that there is no concern of water contamination.

Second Embodiment

Figure 19:
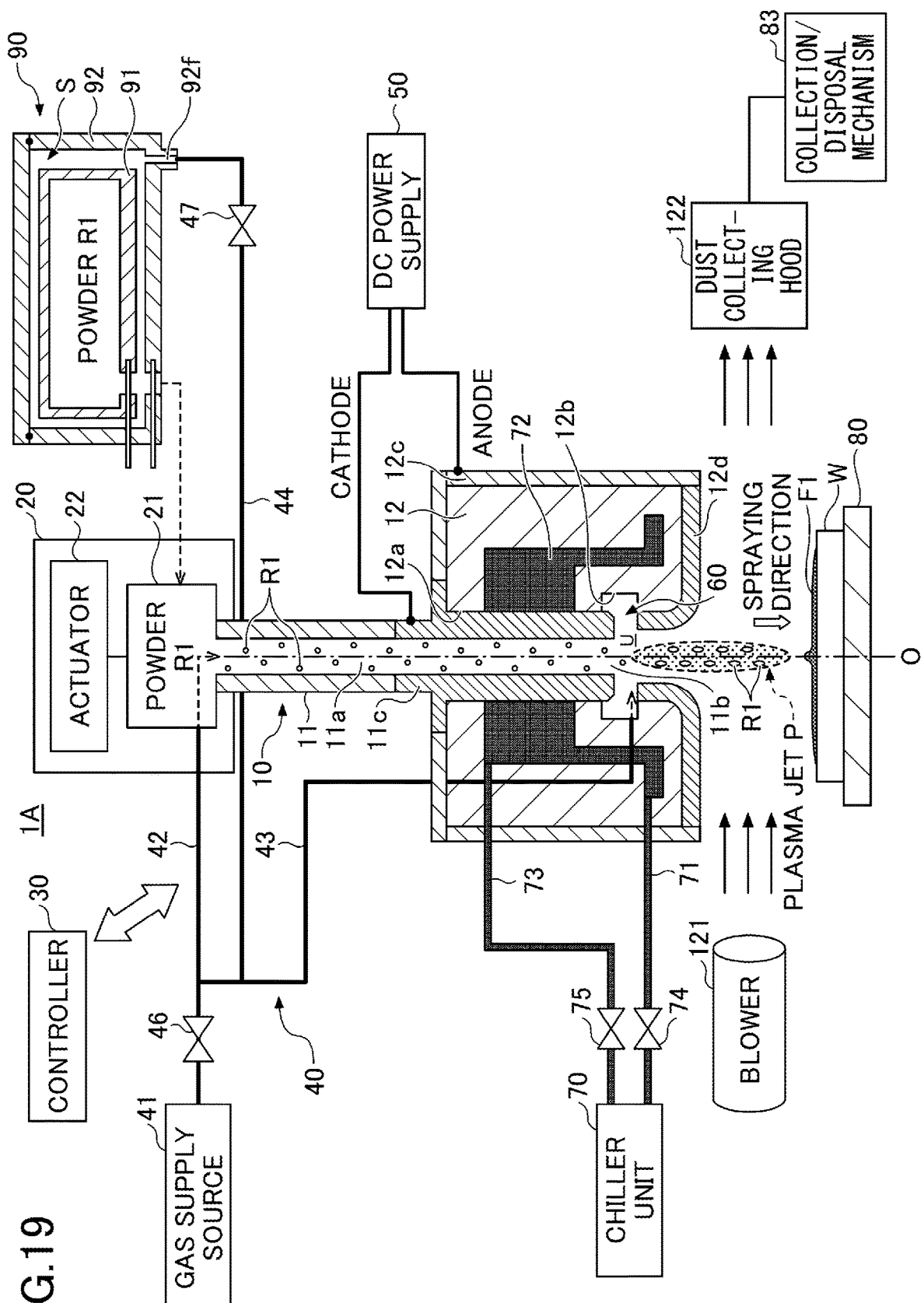
FIG. 19 is a cross-sectional view illustrating an example of the configuration of a plasma spraying apparatus according to a second embodiment.

A plasma spraying apparatus according to a second embodiment will be described with reference to FIG. 19. FIG. 19 is a cross-sectional view illustrating an example of the configuration of the plasma spraying apparatus according to the second embodiment.

As illustrated in FIG. 19, the plasma spraying apparatus 1A is a device that performs plasma spraying in the atmosphere. In the plasma spraying apparatus 1A, powder R1 is injected from an opening 11b at the tip of the nozzle 11, and is sprayed toward the surface of a substrate W in the atmosphere while the powder is melted by heat of a plasma jet P formed from a high-speed gas. As a result, a thermal sprayed film F1 is formed on the surface of the substrate W.

Examples of the substrate W may include a resin, a metal, a ceramic, and a metal fiber. Also, the substrate W may be a flat plate or a 3D molded product made of these materials. Examples of the powder R1 include powder of a metal oxide or a metal nitride.

The plasma spraying apparatus 1A includes a feeding section 10, a controller 30, a gas supply section 40, a plasma generating section 60, a powder feeding mechanism 90, a collection/disposal mechanism 83, a blower 121, and a dust collecting hood 122.

As the configurations of the feeding section 10, the controller 30, the gas supply section 40, the plasma generating section 60, the powder feeding mechanism 90, and the collection/disposal mechanism 83 are similar to those in the first embodiment, description of these configurations will be omitted.

The blower 121 causes air to flow toward the plasma jet P formed by injecting powder R1 from the opening 11b in the tip of the nozzle 11. The air flow rate of the blower 121 may be, for example, 50,000 L/min to 70,000 L/min.

The dust collecting hood 122 collects the powder R1 injected from the opening 11b in the tip of the nozzle 11. The dust collecting hood 122 is disposed downstream of the air stream formed by the blower 121. In other words, the blower 121 and the dust collecting hood 122 are arranged oppositely by interposing the plasma jet P between them. The dust collecting hood 122 is connected to the collection/disposal mechanism 83, and the powder collected by the dust collecting hood 122 is drawn into the collection/disposal mechanism 83, and is discarded by the collection/disposal mechanism 83.

In the plasma spraying apparatus 1A, thermal spraying may be performed while moving the substrate W or while moving the nozzle 11. In a case in which thermal spraying is performed while moving the substrate W, the thermal spraying may be performed while moving, for example, the stage 80 horizontally on which the substrate W is placed. In a case in which thermal spraying is performed while moving the nozzle 11, the feeding section 10 may be secured to, for example, an arm (e.g., multi-joint arm) movable in a horizontal direction, and the thermal spraying may be performed while the feeding section 10 is moved horizontally by the arm.

As described above, according to the plasma spraying apparatus 1A of the second embodiment, the cartridge 91 storing the powder R1 in an airtight condition is attached to the replenishing unit 92, and the powder R1 is supplied to the feeder from the cartridge 91 while maintaining an airtight condition. This allows the powder R1 in the cartridge 91 to be refilled into the container 21 of the feeder 20 without reacting with moisture, nitrogen, and oxygen. Therefore, it is possible to improve the stability of the film quality of the spraying film using the powder R1.

Furthermore, the cartridge 91 is replaced by removing the lid 92b from the body 92a, while the shutter 92d of the replenishing unit 92 is closed. This prevents the interior of the container 21 of the feeder 20 from being exposed to the atmosphere during replacement of the cartridge 91, and prevents the powder R1 in the container 21 from reacting with moisture, oxygen, and nitrogen. Therefore, it is possible to replace the cartridge 91 without stopping the operation of the plasma spraying including operations of inserting the powder R1 into the nozzle 11 from the feeder 20, melting the inserted powder R1, and depositing a film on the substrate W using the molten powder R1.

In the above-described embodiments, the substrate W is an example of a workpiece, and the ejecting mechanism 91c is an example of a control mechanism. The pipe 44 is an example of a gas supply path, and the valve 47 is an example of a third open/close valve. The gas supply section 40 and the exhaust mechanism 120 are an example of a pressure adjustment mechanism, and the container 21 and the actuator 22 are an example of a feed mechanism.

The embodiments disclosed herein should be considered to be examples in all respects and not restrictive. The above embodiments may be omitted, substituted, or modified in various forms without departing from the appended claims and spirit thereof.

In the above-described embodiment, a plasma spraying apparatus for forming a thermal sprayed film on a substrate W by plasma spraying is described, but is not limited thereto. For example, a thermal spraying apparatus for forming a thermal sprayed film on a substrate W by arc spraying or flame spraying may be used.

In the above embodiment, a case in which the powder feeding device is applied to a thermal spraying apparatus is described, but application of the powder feeding device is not limited to a thermal spraying apparatus. The powder feeding device can also be applied, for example, to a device for surface treatment (e.g., sandblasting) of a workpiece by spraying powder in a solid state onto the surface of the workpiece. The powder feeding device is also applicable to a device for forming a film on a workpiece by sublimating powder and by spraying the powder in a state of gas onto the surface of the workpiece.

This international application is based on and claims priority to Japanese Patent Application No. 2018-203266 filed on Oct. 29, 2018, the entire contents of which are herein incorporated by reference.

DESCRIPTION OF SYMBOLS 1, 1A Plasma spraying apparatus
11 Nozzle
20 Feeder
90 Powder feeding mechanism
91 Cartridge
91a Port
91b Shutter
92 Replenishing unit
92a Body
92b Lid
92c Supply port
92d Shutter

What is claimed is:
1. A thermal spraying apparatus comprising a powder feeding device including:
a cartridge configured to store powder in an airtight condition, the cartridge including a port from which the powder is stored and withdrawn, and a first shutter configured to open and close the port; and
a feeder including a connection portion to which the cartridge is removably connected, a supply port configured to supply the powder in the cartridge connected to the connection portion into the feeder, a second shutter configured to open and close the supply port, and a container configured to store the powder; wherein
the feeder is configured to insert the powder supplied from the supply port to the feeder into a nozzle,
the cartridge and the feeder are configured to form an enclosed space between the port and the supply port in response to the cartridge being connected to the connection portion,
the second shutter is located upstream from the container, and
the thermal spraying apparatus is configured to melt the powder of a thermal spraying material inserted into the nozzle from the feeder, and deposit a film onto a workpiece using molten powder.

2. The thermal spraying apparatus according to claim 1, wherein the powder feeding device further includes a pressure adjustment mechanism configured to depressurize or pressurize the enclosed space.

3. The thermal spraying apparatus according to claim 2, wherein the pressure adjustment mechanism includes a gas supply section configured to supply an inert gas to the enclosed space, and an exhaust mechanism configured to evacuate the enclosed space.

4. The thermal spraying apparatus according to claim 1, wherein
the feeder includes a feed mechanism configured to supply the powder to the nozzle, and
the cartridge includes an ejecting mechanism configured to control a flow rate of the powder supplied to the feed mechanism.

5. The thermal spraying apparatus according to claim 1, wherein the feeder includes
a feed mechanism configured to supply the powder to the nozzle, and
an ejecting mechanism configured to control a flow rate of the powder supplied from the cartridge to the feed mechanism.

6. The thermal spraying apparatus according to claim 5, wherein
the first shutter includes
a valve body configured to open and close the port, and
a shaft attached to the valve body, the valve body being rotatable with respect to the shaft; and
the port is opened or closed by moving the shaft in a longitudinal direction of the shaft.

7. The thermal spraying apparatus according to claim 6, wherein the valve body can be moved inside the cartridge or outside the cartridge.

8. The thermal spraying apparatus according to claim 6, wherein the first shutter further includes a valve tilting mechanism configured to adjust an angle of the valve body with respect to the shaft.

9. The thermal spraying apparatus according to claim 1, wherein the powder feeding device further includes a controller configured to control an operation of the first shutter; wherein the controller performs, in response to the enclosed space being formed,
purging the enclosed space by supplying an inert gas to the enclosed space; and
after the purging of the enclosed space, replenishing the feeder with the powder in the cartridge by opening the first shutter and the second shutter.

10. The thermal spraying apparatus according to claim 1, wherein a median particle diameter of the powder is between 1 μm and 20 μm.

11. The thermal spraying apparatus according to claim 1, wherein the powder is at least one type of powder selected from a group consisting of lithium, aluminum, copper, silver, and gold.

12. The thermal spraying apparatus according to claim 1, further comprising a chamber in which the workpiece is accommodated, the chamber being filled with an inert gas.

13. The thermal spraying apparatus according to claim 12, further comprising a liquid seal pump configured to
draw the inert gas and the powder in the chamber, and seal the inert gas and the powder with a working liquid.

14. The thermal spraying apparatus according to claim 12, further comprising:
a dust collecting hood configured to collect the powder injected from the nozzle;
a liquid seal pump connected to the dust collecting hood, the liquid seal pump being configured to seal the powder collected by the dust collecting hood with a working liquid; and
a blower configured to cause air to flow toward the powder and the dust collecting hood.

15. The thermal spraying apparatus according to claim 1, wherein the powder is melted by a plasma.

16. The thermal spraying apparatus according to claim 1, wherein the powder is supplied from the supply port to the feeder when the second shutter opens the supply port, and the powder is not supplied from the supply port to the feeder when the second shutter closes the supply port.

17. The thermal spraying apparatus according to claim 1, wherein the second shutter is provided at the supply port, and communication between an interior of the cartridge and the container is controlled by the second shutter opening and closing the supply port.

18. A powder feeding device comprising:
a cartridge configured to store powder in an airtight condition, the cartridge including a port from which the powder is stored and withdrawn, and a first shutter configured to open and close the port;
a replenishing unit including a housing in which the cartridge is removably stored, a supply port configured to supply the powder in the cartridge stored in the housing into a feeder, and a second shutter configured to open and close the supply port; and
the feeder configured to insert the powder supplied from the supply port into a nozzle; wherein
the cartridge and the replenishing unit are configured to form an enclosed space between the port and the supply port in response to the cartridge being stored into the replenishing unit.

19. A method of supplying powder from a feeder of a powder feeding device of a thermal spraying apparatus to a nozzle, the powder feeding device including:
a cartridge configured to store powder in an airtight condition, the cartridge including a port from which the powder is stored and withdrawn, and a first shutter configured to open and close the port; and
the feeder including a connection portion to which the cartridge is removably connected, a supply port configured to supply the powder in the cartridge connected to the connection portion into the feeder, a second shutter configured to open and close the supply port, and a container configured to store the powder; wherein
the feeder is configured to insert the powder supplied from the supply port to the feeder into a nozzle,
the cartridge and the feeder are configured to form an enclosed space between the port and the supply port in response to the cartridge being connected to the connection portion,
the second shutter is located upstream from the container, and
the thermal spraying apparatus is configured to melt the powder of a thermal spraying material inserted into the nozzle from the feeder, and deposit a film onto a workpiece using molten powder, the method comprising:
purging the enclosed space by supplying an inert gas to the enclosed space;
after the purging of the enclosed space, causing the cartridge to be in communication with the feeder; and replenishing the powder in the cartridge into the feeder in communication with the cartridge.

* * * * *